(12) United States Patent
Wang et al.

(10) Patent No.: US 10,558,908 B2
(45) Date of Patent: Feb. 11, 2020

(54) AGE AND GENDER ESTIMATION USING SMALL-SCALE CONVOLUTIONAL NEURAL NETWORK (CNN) MODULES FOR EMBEDDED SYSTEMS

(71) Applicant: AltumView Systems Inc., Port Moody (CA)

(72) Inventors: Xing Wang, Burnaby (CA); Mehdi Seyfi, North Vancouver (CA); Minghua Chen, Coquitlam (CA); Him Wai Ng, Coquitlam (CA); Jiannan Zheng, Delta (CA); Jie Liang, Coquitlam (CA)

(73) Assignee: AltumView Systems Inc., Port Moody, BC (CA)

(*) Notice: Subject to any disclaimer, the term of this patent is extended or adjusted under 35 U.S.C. 154(b) by 91 days.

(21) Appl. No.: 15/724,256

(22) Filed: Oct. 3, 2017

(65) Prior Publication Data
US 2018/0150684 A1    May 31, 2018

Related U.S. Application Data

(60) Provisional application No. 62/428,497, filed on Nov. 30, 2016.

(51) Int. Cl.
*G06K 9/00* (2006.01)
*G06N 3/04* (2006.01)
(Continued)

(52) U.S. Cl.
CPC .......... *G06N 3/04* (2013.01); *G06K 9/00228* (2013.01); *G06K 9/00268* (2013.01);
(Continued)

(58) Field of Classification Search
CPC .......... G06N 3/04; G06N 3/0454; G06N 3/06; G06N 3/08; G06K 9/4628; G06K 9/6274;
(Continued)

(56) References Cited

U.S. PATENT DOCUMENTS

| 6,990,217 B1* | 1/2006 | Moghaddam .......... G06N 20/00 382/118 |
| 7,912,246 B1* | 3/2011 | Moon ................ G06K 9/00221 382/103 |

(Continued)

*Primary Examiner* — Van D Huynh

(57) ABSTRACT

Embodiments described herein provide various examples of an age and gender estimation system capable of performing age and gender classifications on face images having sizes greater than the maximum number of input pixels supported by a given small-scale hardware convolutional neural network (CNN) module. In some embodiments, the proposed age and gender estimation system can first divide a high-resolution input face image into a set of image patches with judiciously designed overlaps among neighbouring patches. Each of the image patches can then be processed with a small-scale CNN module, such as the built-in CNN module in Hi3519 SoC. The outputs corresponding to the set of image patches can be subsequently merged to obtain the output corresponding to the input face image, and the merged output can be further processed by subsequent layers in the age and gender estimation system to generate age and gender classifications for the input face image.

25 Claims, 18 Drawing Sheets

(51) Int. Cl.

| | |
|---|---|
| *G06K 9/46* | (2006.01) |
| *G06K 9/62* | (2006.01) |
| *G06T 7/11* | (2017.01) |
| *G06T 7/246* | (2017.01) |
| *G06K 9/20* | (2006.01) |
| *G06N 3/06* | (2006.01) |
| *G06N 3/08* | (2006.01) |
| *G06T 5/50* | (2006.01) |

(52) U.S. Cl.
CPC ..... *G06K 9/00275* (2013.01); *G06K 9/00288* (2013.01); *G06K 9/2054* (2013.01); *G06K 9/4628* (2013.01); *G06K 9/6232* (2013.01); *G06K 9/6256* (2013.01); *G06K 9/6274* (2013.01); *G06N 3/0454* (2013.01); *G06N 3/06* (2013.01); *G06N 3/08* (2013.01); *G06T 5/50* (2013.01); *G06T 7/11* (2017.01); *G06T 7/248* (2017.01); *G06K 9/00402* (2013.01); *G06K 9/6289* (2013.01); *G06K 2009/00322* (2013.01); *G06K 2209/15* (2013.01); *G06T 2200/28* (2013.01); *G06T 2207/20021* (2013.01); *G06T 2207/20084* (2013.01); *G06T 2207/20221* (2013.01); *G06T 2207/20224* (2013.01); *G06T 2207/30201* (2013.01); *G06T 2210/12* (2013.01)

(58) Field of Classification Search
CPC ............. G06K 9/00228; G06K 9/2054; G06K 9/6256; G06K 9/6232; G06K 9/00275; G06K 9/00268; G06K 9/00288; G06K 2009/00322; G06K 9/6289; G06K 2209/15; G06K 9/00402; G06T 7/11; G06T 7/248; G06T 5/50; G06T 2207/20021; G06T 2207/20084; G06T 2200/28; G06T 2207/20221; G06T 2207/20224; G06T 2207/30201; G06T 2210/12
USPC ........................................................ 382/118
See application file for complete search history.

(56) References Cited

U.S. PATENT DOCUMENTS

| | | | |
|---|---|---|---|
| 8,027,521 B1* | 9/2011 | Moon | G06K 9/00288 |
| | | | 382/118 |
| 8,831,362 B1* | 9/2014 | Steffens | G06K 9/6292 |
| | | | 382/224 |
| 9,311,564 B2* | 4/2016 | Savvides | G06K 9/481 |
| 9,626,597 B2* | 4/2017 | Xiong | G06K 9/00288 |
| 2011/0222724 A1* | 9/2011 | Yang | G06K 9/00248 |
| | | | 382/103 |
| 2019/0042833 A1* | 2/2019 | Gernoth | G06K 9/00221 |

* cited by examiner

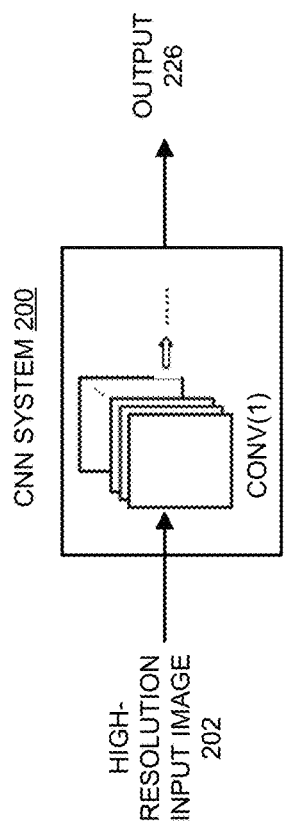
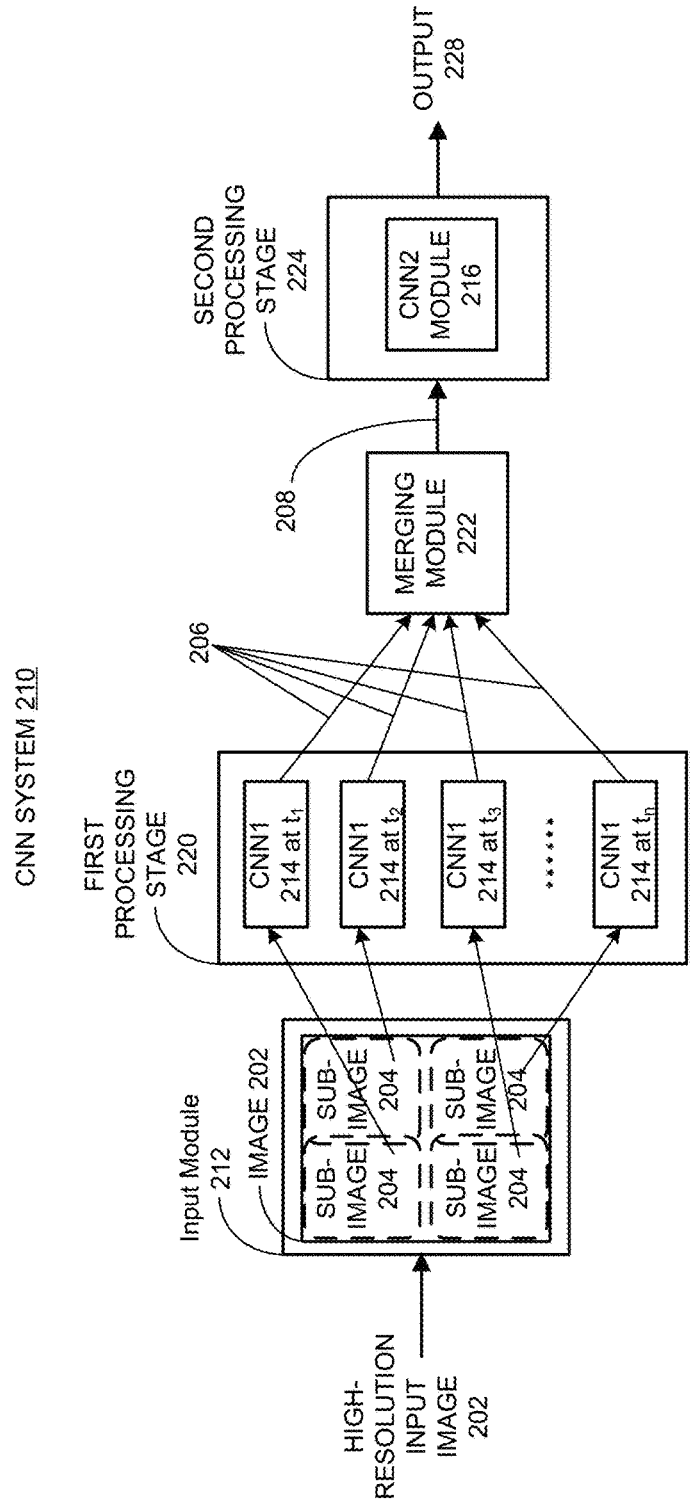

AGE AND GENDER ESTIMATION USING SMALL-SCALE CONVOLUTIONAL NEURAL NETWORK (CNN) MODULES FOR EMBEDDED SYSTEMS

PRIORITY CLAIM AND RELATED PATENT APPLICATIONS

This patent application claims benefit of priority under 35 U.S.C. 119(e) to U.S. Provisional Patent Application No. 62/428,497 entitled "Convolutional Neural Networks (CNN) Based on Resolution-limited Small-scale CNN Modules," by inventors Xing Wang, Him Wai Ng, Jie Liang, and filed on Nov. 30, 2016, the content of which is incorporated herein by reference as a part of this patent document.

This patent application is also related to a pending U.S. patent application entitled, "Convolutional Neural Network (CNN) System Based on Resolution-limited Small-scale CNN Modules," by inventors Xing Wang, Him Wai Ng, Jie Liang, having patent application Ser. No. 15/441,194, and filed on 23 Feb. 2017. The above-listed application is hereby incorporated by reference as a part of this patent document. This patent application is also related to a pending U.S. patent application Ser. No. 15/657,109 entitled, "Face Detection Using Small-scale Convolutional Neural Network (CNN) Modules for Embedded Systems," by inventors Xing Wang, Mehdi Seyfi, Minghua Chen, Him Wai Ng, Jie Liang, and filed on 21 Jul. 2017.

TECHNICAL FIELD

The present disclosure generally relates to the field of machine learning and artificial intelligence, and more specifically to systems, devices and techniques for estimating human gender and age group from input face images using a small-scale hardware convolutional neural network (CNN) module.

BACKGROUND

Deep learning (DL) is a branch of machine learning and artificial neural network based on a set of algorithms that attempt to model high level abstractions in data by using a deep graph with multiple processing layers. A typical DL architecture can include many layers of neurons and millions of parameters. These parameters can be trained from large amount of data on fast GPU-equipped computers, guided by novel training techniques that can work with many layers, such as rectified linear units (ReLU), dropout, data augmentation, and stochastic gradient descent (SGD).

Among the existing DL architectures, convolutional neural network (CNN) is one of the most popular DL architectures. Although the idea behind CNN has been known for more than 20 years, the true power of CNN has only been recognized after the recent development of the deep learning theory. To date, CNN has achieved numerous successes in many artificial intelligence and machine learning applications, such as face recognition, image classification, image caption generation, visual question answering, and automatic driving cars.

Face detection is an important process in many face recognition applications. A large number of face detection techniques can easily detect near frontal faces. However, robust and fast face detection in uncontrolled situations can still be a challenging problem, because such situations are often associated with significant amount of variations of faces, including pose changes, occlusions, exaggerated expressions, and extreme illumination variations. Some effective face detection techniques that can manage such uncontrolled situations include (1) a cascaded convolutional neural networks (CNN) framework described in "A Convolutional Neural Network Cascade for Face Detection," H. Li, Z. Lin, X. Shen, J. Brandt, and G. Hua, Proc. IEEE Conf. on Computer Vision and Pattern Recognition, Jun. 1, 2015 (referred to as "the cascaded CNN" or "the cascaded CNN framework" hereinafter), and (2) a multitask cascaded CNN framework described in "Joint Face Detection and Alignment Using Multitask Cascaded Convolutional Networks," K. Zhang, Z. Zhang, Z. Li, and Y. Qiao, IEEE Signal Processing Letters, Vol. 23, No. 10, pp. 1499-1503, Oct. 2016 (referred to as "the MTCNN" or "the MTCNN framework" hereinafter).

In the cascaded CNN, a coarse-to-fine cascaded CNN architecture is proposed for face detection. More specifically, instead of using a single deep neural network, the cascaded CNN uses several shallow neural networks operating on different resolutions of the input image, so that the CNN can quickly reject those background regions in the low resolution stages, and then carefully evaluate a small number of candidate regions in the final high resolution stage. To improve localization effectiveness, a calibration stage is used after each detection/classification stage to adjust the detection window (or "the bounding box") position. As a result, the cascaded CNN typically requires six stages and six simple CNNs: three of those for binary face detection/classification, and three more for bounding box calibration. This face detection framework can be highly suitable for implementations in the embedded environments due to the cascade design and the simple CNN used by each stage. Note that, each of the bounding box calibration stages in the cascaded CNN requires an additional CNN and thus extra computational expense. Moreover, in the cascaded CNN, the inherent correlation between face detection and face alignment is ignored.

In the MTCNN, a multi-task cascaded CNN is proposed, which integrates the face detection and face alignment operations using unified cascaded CNNs through multi-task learning. In principal, the MTCNN also uses several coarse-to-fine CNN stages to operate on different resolutions of the input image. However, in the MTCNN, facial landmark localization, binary face classification, and bounding box calibration are trained jointly using a single CNN in each stage. As a result, only three stages are needed in the MTCNN. More specifically, the first stage of the MTCNN generates candidate facial windows quickly through a shallow CNN. Next, the second stage of the MTCNN refines the candidate windows by rejecting a large number of non-face windows through a more complex CNN. Finally, the third stage of the MTCNN uses a more powerful CNN to further decide whether each input window is a face or not. If it is determined to be so, the locations of five facial landmarks are also estimated. The performance of the MTCNN is notably improved compared to previous face detection systems. The MTCNN framework is generally more suitable for implementations on resource-limited embedded systems compared to the aforementioned cascaded CNN framework.

SUMMARY

Embodiments described herein provide various examples of an age and gender estimation system capable of performing age and gender classifications on digital images of human faces (also referred to as "face images" hereinafter) having sizes greater than the maximum number of input pixels supported by a given small-scale hardware convolutional neural network (CNN) module. In some embodiments, the proposed age and gender estimation system can first divide a high-resolution input face image into a set of properly sized image patches (also referred to as "subimages") with judiciously designed overlaps among neighbouring patches. Each of the image patches can then be processed with a small-scale CNN module, such as the built-in CNN module in the Hi3519 chipset from HiSilicon, a subsidiary of Huawei Technologies Co. Ltd. The outputs corresponding to the set of image patches can be subsequently merged to obtain the output corresponding to the high-resolution input face image, and the merged output can be further processed by subsequent layers in the age and gender estimation system to generate age and gender classifications for the input face image.

The proposed age and gender estimation system can be implemented within a low-cost embedded system including at least one small-scale hardware CNN module and integrated with a face detection system which is also implemented on the low-cost embedded system. In some embodiments, the proposed age and gender estimation system can be coupled to the face detection system to perform age and gender estimation on the detected face images generated by the face detection system, wherein both the age and gender estimation system and the face detection system can perform their designated operations using the at least one small-scale CNN module such as Hi3519. By applying the subimage-based technique on high-resolution face images, the proposed age and gender estimation system can perform age and gender estimation on the small-scale CNN module without compromising the accuracy of the age and gender estimation. The ability to perform age and gender estimation in-situ within an embedded system based on the captured and detected face images rather than using a separate device, system, or server to perform such operations can significantly reduce operational cost. In some embodiments, the proposed age and gender estimation system can also be implemented on a low-cost embedded system which does not include a face detection mechanism. In these embodiments, the low-cost embedded system can directly receive face images from one or more external sources, and subsequently perform dedicated age and gender estimation operations on the received face images using the proposed age and gender estimation system.

In one aspect, a process for performing age and gender estimation on face images using a small-scale convolutional neural network (CNN) module associated with a maximum input size constraint is disclosed. This process includes the steps of receiving an input face image which is primarily occupied by a human face and subsequently determining if the size of the input face image is greater than the maximum input image size supported by the small-scale CNN module according to the maximum input size constraint. If so, the process further determines if the size of the input face image meets a predetermined input image size constraint. This predetermined input image size constraint is a given image size among a plurality of image sizes which satisfy a condition for partitioning an input image into a set of subimages of a second size, wherein the second size is smaller than the maximum input image size. If the size of the input face image meets the predetermined input image size constraint, the process further performs the steps of: partitioning the input face image into a set of subimages of the second size; processing the set of subimages using the small-scale CNN module to generate an array of feature maps; merging the array of feature maps into a set of merged feature maps corresponding to the input face image; and processing the set of merged feature maps with two or more fully-connected layers to generate one or both of age and gender classifications for the person in the input face image.

In some embodiments, if the size of the input face image does not meet the predetermined input image size constraint, the process further performs the steps of: resizing the input face image to the given image size that meets the predetermined input image size constraint; partitioning the resized input face image into a set of subimages of the second size; processing the set of subimages using the small-scale CNN module to generate an array of feature maps; merging the array of feature maps into a set of merged feature maps corresponding to the resized input face image; and processing the set of merged feature maps with two or more fully-connected layers to generate one or both of age and gender classifications for the person in the input face image.

In some embodiments, resizing the input face image to the given image size includes: if the size of the input face image is greater than the given image size, downsampling the input face image to the given image size; and if the size of the input face image is smaller than the given image size, upsampling the input face image to the given image size.

In some embodiments, if the size of the input face image is smaller than or equal to the maximum input image size associated with the small-scale CNN module, the process processes the input face image directly with the small-scale CNN module without partitioning the input face image into a set of subimages of a smaller size.

In some embodiments, if the size of the input face image is smaller than or equal to the maximum input image size associated with the small-scale CNN module, the process further performs steps of: upsampling the input face image to the given image size that meets the predetermined input image size constraint; partitioning the resized input face image into a set of subimages of the second size; processing the set of subimages using the small-scale CNN module to generate an array of feature maps; merging the array of feature maps into a set of merged feature maps corresponding to the resized input face image; and processing the set of merged feature maps with two or more fully-connected layers to generate one or both of age and gender classifications for the person in the input face image.

In some embodiments, the input face image is an output of a face detection CNN module which detects human faces from input video images.

In some embodiments, the small-scale CNN module includes three convolution layers, wherein each of the three convolution layers is followed by a rectified linear units (ReLU) layer and a pooling layer.

In some embodiments, the last one of the two or more fully-connected layers includes a softmax classifier.

In another aspect, an age and gender estimation system using at least one small-scale CNN module is disclosed. This age and gender estimation system includes: an input module to receive an input face image which is primarily occupied by a human face; a small-scale CNN module coupled to an output of the input module to process a face image using a set of filters, wherein the small-scale CNN module has a maximum input size constraint; a merging module coupled to an output of the small-scale CNN module; and a decision module comprising two or more fully-connected layers and coupled to an output of the merging module. In some embodiments, the input module is further configured to: determine if the size of the input face image is greater than the maximum input image size supported by the small-scale CNN module according to the maximum input size constraint; if so, determine if the size of the input face image meets a predetermined input image size constraint. The predetermined input image size constraint is a given image size among a plurality of image sizes which satisfy a condition for partitioning an input image into a set of subimages of a second size, and the second size is smaller than the maximum input image size. If the size of the input face image meets the predetermined input image size constraint, the input module is further configured to partition the input face image into a set of subimages of the second size. The small-scale CNN module is configured to process the set of subimages to generate an array of feature maps. The merging module is configured to merge the array of feature maps into a set of merged feature maps corresponding to the input face image. Finally, the decision module is configured to process the set of merged feature maps with the two or more fully-connected layers to generate one or both of age and gender classifications for the person in the input face image.

In some embodiments, if the size of the input face image does not meet the predetermined input image size constraint, the input module resizes the input face image to the given image size that meets the predetermined input image size constraint and partition the resized input face image into a set of subimages of the second size; the small-scale CNN module processes the set of subimages to generate an array of feature maps; the merging module merges the array of feature maps into a set of merged feature maps corresponding to the resized input face image; and the decision module processes the set of merged feature maps with two or more fully-connected layers to generate one or both of age and gender classifications for the person in the input face image.

In some embodiments, the input module resizes the input face image to the given image size by: downsampling the input face image to the given image size if the size of the input face image is greater than the given image size; and upsampling the input face image to the given image size if the size of the input face image is smaller than the given image size.

In some embodiments, if the size of the input face image is smaller than or equal to the maximum input image size associated with the small-scale CNN module, the small-scale CNN module processes the input face image directly without partitioning the input face image into a set of subimages of a smaller size.

In some embodiments, if the size of the input face image is smaller than or equal to the maximum input image size associated with the small-scale CNN module, the input module upsamples the input face image to the given image size that meets the predetermined input image size constraint and partitions the resized input face image into a set of subimages of the second size; the small-scale CNN module processes the set of subimages to generate an array of feature maps; the merging module merges the array of feature maps into a set of merged feature maps corresponding to the resized input face image; and the decision module processes the set of merged feature maps with two or more fully-connected layers to generate one or both of age and gender classifications for the person in the input face image.

In some embodiments, the input module is coupled to an output of a face detection CNN module which detects human faces from input video images, and the input face image is an output of the face detection CNN module.

In some embodiments, the small-scale CNN module is a hardware CNN module embedded within a chipset or a system on chip (SoC).

In some embodiments, the merging module merges the array of feature maps by concatenating the array of feature maps into a one-dimensional vector.

In yet another aspect, an embedded system capable of performing both face detection and age and gender estimation in-situ on captured video images is disclosed. This embedded system includes: a processor; a memory coupled to the processor; an image capturing device coupled to the processor and the memory and configured to capture video images; a face detection subsystem coupled to the image capturing device and configured to detect human faces from the capture video images; and an age and gender estimation subsystem coupled to the face detection subsystem and including a small-scale CNN module associated with a maximum input size constraint. In some embodiments, this age and gender estimation subsystem is configured to: receive a detected face image from the face detection subsystem which is primarily occupied by a human face; determine if the size of the detected face image is greater than the maximum input image size supported by the small-scale CNN module according to the maximum input size constraint; and if so, determine if the size of the detected face image meets a predetermined input image size constraint. The predetermined input image size constraint is a given image size among a plurality of image sizes which satisfy a condition for partitioning an input image into a set of subimages of a second size, and the second size is smaller than the maximum input image size. If the size of the detected face image meets the predetermined input image size constraint, this age and gender estimation subsystem is further configured to: partition the detected face image into a set of subimages of the second size; process the set of subimages using the small-scale CNN module to generate an array of feature maps; merge the array of feature maps into a set of merged feature maps corresponding to the detected face image; and process the set of merged feature maps with two or more fully-connected layers to generate one or both of age and gender classifications for the person in the detected face image.

In some embodiments, the small-scale CNN module is a low-cost hardware CNN module which is shared by the age and gender estimation subsystem and the face detection subsystem.

In yet another aspect, a process for performing deep-learning image processing using a small-scale CNN module associated with a maximum input size constraint is disclosed. This process starts off by receiving an input image. The process subsequently determines if the size of the input image is greater than the maximum input image size supported by the small-scale CNN module according to the maximum input size constraint. If so, the process further performs the steps of: partitioning the input image into a set of subimages of a second size smaller than the maximum input image size; processing the set of subimages using the small-scale CNN module to generate an array of feature maps; merging the array of feature maps into a set of merged feature maps corresponding to the input image; and processing the set of merged feature maps with two or more fully-connected layers to generate a classification decision on the input image.

In some embodiments, the size of the input image meets a predetermined input image size constraint, wherein the predetermined input image size constraint is a given image size among a plurality of image sizes which satisfy a condition for partitioning an input image into a set of subimages of the second size.

In some embodiments, if the size of the input image is smaller than or equal to the maximum input image size supported by the small-scale CNN module, the process processes the input image directly with the small-scale CNN module without partitioning the input image into a set of subimages of a smaller size.

In some embodiments, the input image is an input face image which is primarily occupied by a human face, and the classification decision on the input image includes one or both of age and gender classifications for the person in the input face image.

In some embodiments, the set of subimages includes a predetermined overlap between a pair of adjacent subimages in the set of subimages, and in the array of feature maps there is no overlap or gap between a pair of adjacent feature maps corresponding to a pair of adjacent subimages.

BRIEF DESCRIPTION OF THE DRAWINGS

The structure and operation of the present disclosure will be understood from a review of the following detailed description and the accompanying drawings in which like reference numerals refer to like parts and in which:

FIG. 2A shows a block diagram of a conventional full-image-based CNN system for processing higher-resolution input images.

FIG. 2B shows a block diagram of a subimage-based CNN system.

DETAILED DESCRIPTION

Figure 1A:
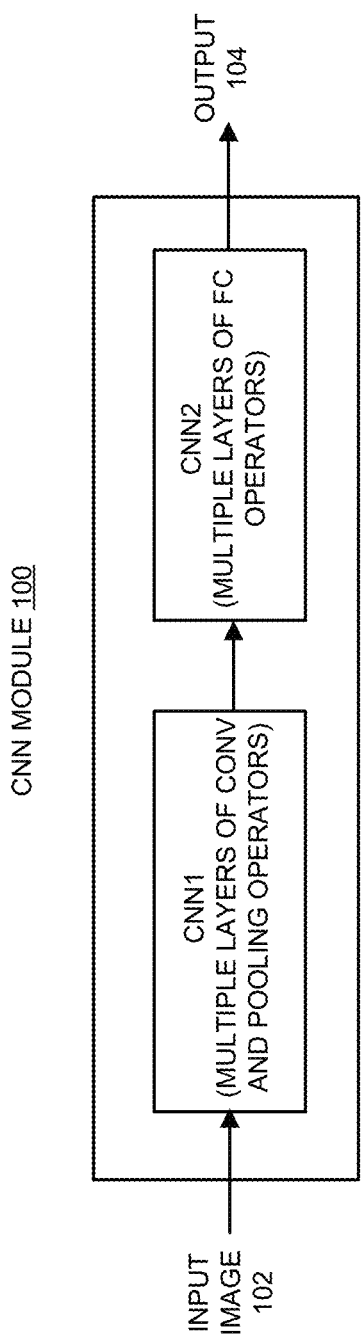
FIG. 1A shows a block diagram of a small-scale hardware CNN module for processing a low-resolution input image.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Throughout the specification, the following terms have the meanings provided herein, unless the context clearly dictates otherwise. The terms "image resolution" and "image size" are used interchangeably to mean the number of pixels within a given two-dimensional (2D) image.

In this patent disclosure, various examples of a face detection system, technique and architecture based on using a small-scale low-cost CNN module configured into a multi-task cascaded CNN are described. In some embodiments, the small-scale low-cost CNN module is embedded within a chipset or a system on chip (SoC). Hence, the proposed face detection system, technique and architecture can be implemented on a chipset or a SoC that includes such a small-scale low-cost CNN module. In a particular example, the proposed face detection system, technique and architecture can be implemented on a HiSilicon Hi3519 SoC (or "Hi3519," "Hi3519 SoC" hereinafter) developed for smart cameras by HiSilicon Semiconductor Co. Ltd., a subsidiary of Huawei Technologies Co. Ltd. Notably, Hi3519 SoC includes both a build-in hardware CNN module and a CPU that can execute some simple software CNN functions.

This patent disclosure additionally provides various examples of an age and gender estimation system capable of performing age and gender classifications on digital images of human faces (also referred to as "face images" hereinafter) having sizes greater than the maximum number of input pixels supported by a given small-scale hardware convolutional neural network (CNN) module. In some embodiments, the proposed age and gender estimation system can first divide a high-resolution input face image into a set of properly sized image patches (also referred to as "subimages") with judiciously designed overlaps among neighbouring patches. Each of the image patches can then be processed with a small-scale CNN module, such as the built-in CNN module in Hi3519. The outputs corresponding to the set of image patches can be subsequently merged to obtain the output corresponding to the high-resolution input face image, and the merged output can be further processed by subsequent layers in the age and gender estimation system.

The proposed age and gender estimation system can be implemented within a low-cost embedded system including at least one small-scale hardware CNN module and integrated with the aforementioned face detection system which is also implemented on the low-cost embedded system. In some embodiments, the proposed age and gender estimation system can be coupled to the face detection system to perform age and gender estimation on the detected face images generated by the face detection system, wherein both the age and gender estimation system and the face detection system can perform their designated operations using the at least one small-scale CNN module such as Hi3519. By applying the subimage-based technique on high-resolution face images, the proposed age and gender estimation system can perform age and gender estimation on the small-scale CNN module without compromising the accuracy of the age and gender estimation. The ability to perform age and gender estimation in-situ within an embedded system based on the captured and detected face images rather than using a separate device, system, or server to perform such operations can significantly reduce operational cost. In some embodiments, the proposed age and gender estimation system can also be implemented on a low-cost embedded system which does not include a face detection mechanism. In these embodiments, the low-cost embedded system can directly receive face images from one or more external sources, and subsequently perform dedicated age and gender estimation operations on the received face images using the proposed age and gender estimation system.

Most existing CNN-based DL architectures and systems are not cost-effective for many embedded system applications. Meanwhile, some low-cost CNN-enabled embedded systems based on low-cost chipsets have started to emerge. One notable example is the Hi3519 SoC. The cost of Hi3519 SoC is significantly lower than Nvidia™ TK1/TX1 chipsets. Hi3519 SoC also includes a built-in hardware CNN module with many promising features. For example, the parameters of the built-in CNN module in Hi3519 SoC are reconfigurable, i.e., users can modify the network architecture and the parameters, which can be pre-trained for different applications. Moreover, this built-in CNN module is quite fast.

Designed to reduce cost, these small-scale low-cost CNN modules, such as Hi3519 SoC often have limited capability and a number of constraints. For example, in Hi3519 SoC, the maximum number of pixels in the input image for the embedded CNN module is 1280. However, in the above-described MTCNN framework, the input image sizes increase rapidly from one stage to the next in the coarse-to-fine architecture. For example, in some implementations of the MTCNN, the input image size to the second stage can be $24\times24\times3=1728$, and the input image size to the third stage can be $48\times48\times3=6912$. Both of these input sizes exceed the input size limit of the embedded CNN module within Hi3519 SoC. To implement the MTCNN on Hi3519 SoC, one may modify the MTCNN to use smaller input image sizes and downsample the input videos accordingly. However, in doing so, the quality of the faces in the videos will be significantly degraded, and as a result the face detection performance will suffer greatly.

Related patent application Ser. No. 15/441,194, the content of which is incorporated by reference herein, provides a solution to the above-described problems of implementing the MTCNN on a small-scale low-cost CNN module, such as Hi3519 SoC. To solve the problem that an input image size is greater than the maximum input size of a CNN module, the related patent application provides various embodiments of a subimage-based CNN system which first divides a larger input image into a set of smaller subimages, while including judiciously designed overlaps among neighboring subimages. Each of the subimages can then be processed by a small-scale hardware CNN module, such as the built-in CNN module in Hi3519 SoC. The outputs corresponding to the set of subimages can then be merged, and the merged result can be further processed by the next stage. The subimage-based CNN system described in the related patent application can be configured to be equivalent to a large-scale CNN that processes the entire input image without partitioning such that the output of the subimage-based CNN system can be exactly identical to the output of the large-scale CNN. Based on this observation, some embodiments of this patent disclosure make use of the subimage-based CNN system and technique on one or more stages of the cascaded CNN or the MTCNN so that a larger input image to a given stage of the cascaded CNN or the MTCNN can be partitioned into a set of subimages of a smaller size. As a result, each stage of the cascaded CNN or the MTCNN can use the same small-scale hardware CNN module that is associated with a maximum input image size constraint.

In some embodiments, to improve real-time face detection performance, the proposed face detection technique and system detects those moving areas in each of the video frames/images. For example, the proposed face detection technique and system can use a built-in background subtraction module of Hi3519 to detect those moving areas in the video frame. Next, the proposed face detection technique and system uses a coarse-to-fine multi-stage CNN to detect most or all faces in the video frame. More specifically, for each stage in the multi-stage CNN which has an input image size constraint, the subimage-based CNN framework can be applied. For example, some embodiments of the proposed face detection technique only need to apply the subimage-based CNN framework to the last stage of a multi-stage CNN framework.

In some embodiments, to improve real-time face detection efficiency, the proposed face detection technique and system can also identify the facial landmark points of each detected face (such as eyes, noses, and mouths). This information allows the system to track each face, select the best-pose image (also referred to as "the best face") of each person, e.g., the one that is closest to the front-view, and send the best face to the server for further processing, such as face retrieval. By transmitting the faces in the video frame, it is not necessary to transmit the entire video frame to the server for some applications, thereby reducing the requirements of the network bandwidth and computational resource of the server. The saving can be especially significant for systems which are equipped with a large number of cameras to simultaneously capture multiple channels of video signals in their applications.

In the following discussion, we may use the built-in hardware CNN module within Hi3519 SoC as an example to illustrate some exemplary implementations of the proposed face detection CNN system and technique. However, it should be noted that the proposed face detection CNN system and technique are not limited to a particular chipset or SoC, such as Hi3519 SoC. The disclosed face detection system and technique of using small-scale hardware CNN modules to replace larger, more complex CNN modules in some or all stages of the cascaded CNN or the MTCNN can be applied to any small-scale hardware CNN modules or any chipset or SoC that includes embedded small-scale hardware CNN modules. Moreover, the disclosed face detection system and technique can be implemented as a single field programmable gate array (FPGA) module, and integrated within an embedded platform.

Summary of the Related Subimage-Based CNN Framework

The subimage-based CNN system described in the related patent application Ser. No. 15/441,194 is constructed based on small-scale low-cost hardware CNN modules. This subimage-based CNN system can be implemented in resource-limited systems, such as embedded systems and mobile devices, to allow these systems to perform tasks which would typically require large-scale, high-complexity expensive CNN systems. This subimage-based CNN system can also be implemented in existing DL systems to replace large-scale, high-complexity CNN modules to significantly reduce system cost. For example, this subimage-based CNN system allows for using low-cost CNN-enabled embedded systems on high-complexity CNN applications, such as processing high-resolution input images which would otherwise not be feasible for resource-limited embedded systems. In some embodiments, the subimage-based CNN system reuses one or more small-scale hardware CNN modules which are designed to process input images of lower resolutions, such as the built-in hardware CNN module within Hi3519 SoC, so that the subimage-based CNN system can be applied to higher-resolution input images and more challenging tasks which typically require the processing power of expensive and large-scale hardware CNN modules.

The subimage-based CNN system is a tiered system which is configured to manage a complex task based on a divide-and-conquer approach. In some embodiments described in the related patent application, the subimage-based CNN system is constructed with two or more stages, wherein each of the two or more stages is implemented with either one or more small-scale low-cost hardware CNN modules or with software which operates on low-resolution inputs. As such, each of the two or more stages can have a very low-complexity. More specifically, to use the subimage-based CNN system, an original high-resolution input image can be partitioned into a set of subimages of the same size which is much smaller than the size of the original input image, wherein the partition can include properly designed overlaps among adjacent subimages. These subimages are fed into the first stage of the subimage-based CNN system which includes at least one small-scale low-cost hardware CNN module designed to handle low-resolution input images, and the outputs from the first stage of the processed set of subimages are subsequently merged. More specifically, the set of subimages can be processed by reusing the one or more small-scale hardware CNN modules repeatedly on the set of subimages. In this manner, a high-resolution input image can be processed by the one or more small-scale hardware CNN modules by way of reusing the one or more small-scale hardware CNN modules on the set of subimages.

The outputs from the first stage based on the set of subimages are subsequently merged. In some embodiments, the subimage-based CNN system includes provisions to the sizes of the input images and subimages to ensure that the merged result to be substantially or exactly identical to the output of a large-scale high-complexity CNN module that processes the entire high-resolution input image without partition. Next, the merged result is processed by the second stage of the subimage-based CNN system, which can also be implemented with one or more small-scale hardware CNN modules or be implemented with software. In this manner, the disclosed CNN system manages high-complexity tasks such as processing high-resolution input images without requiring large-scale, high-complexity, expensive hardware modules, thereby improving trade-off between performance and cost. Hence, this subimage-based CNN system can be highly applicable to resource-limited embedded systems, such as various surveillance cameras, machine vision cameras, drones, robots, self-driving cars, and mobile phones.

A Small-Scale Low-Cost Hardware CNN Module

FIG. 1A shows a block diagram of a small-scale hardware CNN module 100 for processing a low-resolution input image. In some embodiments, the CNN module 100 is configured to extract features of a resolution-limited input image and make various DL inferences, depending on the applications. As can be seen in FIG. 1A, CNN module 100 includes at least two submodules, denoted as CNN1 and CNN2. In some embodiments, CNN module 100 is configured to limit the input image 102 size to no more than 1280 pixels, for example, an image resolution of 32×40 pixels. This limitation on the input image sizes also significantly limits the types of applications which are suitable for CNN module 100.

Figure 1B:
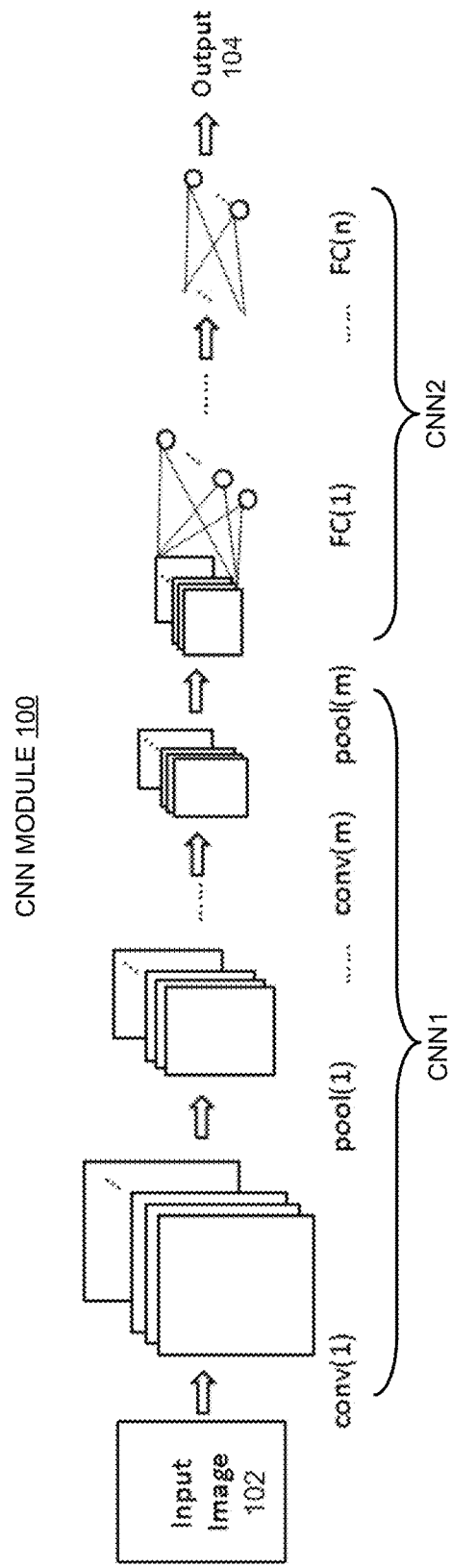
FIG. 1B shows a more detailed implementation of the hardware CNN module in FIG. 1A.

FIG. 1B shows a more detailed implementation of hardware CNN module 100. As can be seen in FIG. 1B, the first submodule CNN1 in FIG. 1A further includes multiple alternating convolution (CONV) layers, rectified linear unit (ReLU) layers (not shown) and pooling layers coupled in series. Moreover, for each of the CONV layers, such as CONV(1) layer, a set of convolution filters are employed to extract a set of particular features from input image 102. Each of the CONV layers in the submodule CNN1 is followed by a corresponding ReLU layer (not shown) and pooling layer, such as POOL(1) layer, which is configured to reduce the size of the filtered images generated by the corresponding CONV layer, while preserving some of the extracted features.

Also shown in FIG. 1B, the second submodule CNN2 in FIG. 1A further includes multiple alternating fully-connected (FC) layers and ReLU layers (not shown) coupled in series. Each of the FC layers, such as FC(1) layer, in the submodule CNN2 is configured to perform matrix multiplications. Each of the FC layers (except for the last FC layer) is followed by a corresponding ReLU layer (not shown). Although not explicitly shown in FIG. 1B, each of the ReLU layers in CNN1 and CNN2 is configured to provide nonlinear characteristics to the CNN system. Finally, at the output of the last FC layer (e.g., FC(n) layer), a decision module (also not shown) is configured to make a prediction based on the output of the last FC layer, thereby generating the output 104 of the CNN module 100. In some embodiments, the first submodule CNN1 includes 1~8 CONV, ReLU, and pooling layers, while the second submodule CNN2 includes 3~8 fully-connected (FC) layers and ReLU layers.

In some embodiments, the number of convolution filters in each of the CONV layers is at most 50, and only 3×3 filters are allowed. Moreover, the convolution stride is fixed to be 1, and no zero padding is used. In some embodiments, the pooling layers in CNN1 can use a max-pooling technique to select the maximum value from each of the 2×2 regions in the filter images. In some embodiments, both max-pooling and average pooling are supported, but the pooling window size is fixed to 2×2, and the stride is fixed to 2. In other words, each of the image width and height is reduced by one half after each pooling layer.

For the example of the hardware CNN module within Hi3519 SoC, the maximum input dimension for the first FC layer is 1024, and the number of neurons in the middle FC layers is at most 256. The dimension of the CNN module output is at most 256. Due to these constraints, the hardware CNN module within Hi3519 SoC is typically only suitable for performing simple applications such as handwritten digit recognition and license plate recognition. For more challenging applications such as face recognition, directly applying a small-scale CNN module such as CNN module 100 would be infeasible at least because of the following reasons. First, the maximum input resolution of 1280 pixels (such as 40×32) is very restrictive, because a face image down-sampled to this resolution loses too much important facial information. Second, the learning capacity of the small CNN module 100 is also extremely limited.

A Tiered Subimage-Based CNN Architecture and System

FIG. 2A shows a block diagram of a conventional full-image-based CNN system 200 for processing high-resolution input images. As can be seen, conventional CNN system 200 can receive an entire high-resolution input image 202 at the first convolution layer CONV(1) and start performing feature extraction operations on the high-resolution input image 202. As such, conventional CNN system 200 can directly process the full high-resolution input image 202 without partitioning the input image. However, conventional CNN system 200 also requires using large-scale expensive chips capable of handling such high-resolution input images, such as aforementioned Nvidia™ chips.

FIG. 2B shows a block diagram of a subimage-based CNN system 210. In the disclosed CNN system 210, a resolution-limited small-scale CNN module, such as CNN module 100 described in conjunction with FIGS. 1A and 1B or the hardware CNN module inside Hi3519 SoC can be used as a building block of subimage-based CNN system 210. As mentioned above, such a small-scale CNN module has a limitation on the maximum input image size, e.g., up to 1280 pixels. To be able to use this small-scale CNN module on a high-resolution input image 202 (e.g., an image having >1280 pixels), the CNN system 210 includes an input module 212 which is configured to partition the high-resolution input image 202 into a set of smaller subimages 204, wherein each of the subimages 204 has a size which is smaller than or equal to the maximum input image size allowed/supported by the small-scale CNN module used as a building block of CNN system 210. In some embodiments, input module 212 is configured to partition the high-resolution input image 202 by including properly designed overlaps between the adjacent subimages 204, as shown in FIG. 2B. Note that the set of four subimages 204 in two rows and two columns with the illustrated gaps and overlaps are shown in FIG. 2B for the convenience of understanding the concept and not meant for representing an actual partition.

As shown in FIG. 2B, CNN system 210 includes a two-tiered processing structure based on using and/or reusing one or both of the two hardware submodules CNN1 and CNN2 of small-scale CNN module 100 described in FIGS. 1A and 1B. In addition to the input module 212, CNN system 210 also includes a first processing stage 220, a merging module 222 and a second processing stage 224. More specifically, first processing stage 220 of CNN system 210 includes at least one CNN1 processing module, such as CNN1 module 214. In some embodiments, CNN1 module 214 is implemented by the hardware submodule CNN1 described in FIGS. 1A and 1B. In other embodiments, CNN1 module 214 is implemented by the entire CNN module 100 described in FIGS. 1A and 1B which includes both CNN1 and CNN2 submodules. Note that the multiple instances of CNN1 module 214 shown within the first processing stage 220 represent the same CNN1 module 214 being used at different times $t_1, t_2, t_3, \ldots,$ and $t_n$ as indicated for each such instance. Consequently, "CNN1 214 at $t_1$," "CNN1 214 at $t_2$," "CNN1 214 at $t_3$," ..., and "CNN1 214 at $t_n$," shown in FIG. 2B correspond to a single CNN1 module 214 at different processing times and should not be interpreted as multiple CNN1 modules having the same numeral 214. Although not shown, the first processing stage 220 can include additional CNN1 modules similar to CNN module 214. For example, the first processing stage 220 can include two or more identical CNN1 modules.

The second processing stage 224 of CNN system 210 includes at least one CNN2 module 216. In some embodiments, CNN2 module 216 is implemented by the hardware submodule CNN2 described in FIGS. 1A and 1B. In other embodiments, CNN2 module 216 is implemented by the entire CNN module 100 described in FIGS. 1A and 1B which includes both CNN1 and CNN2 submodules. In some other embodiments, CNN2 module 216 within the second processing stage 224 can be implemented by software instead of hardware.

Specifically, to process the set of subimages 204 generated by input module 212, single CNN1 module 214 is used multiple times by sequentially processing the set of subimages 204, one subimage at a time. That is, each instance of CNN1 block 214 within the first processing stage 220 of CNN system 210 represents one of the multiple applications of the same CNN1 module 214 on one of the set of subimages 204 at a different processing time. However, because the processing speed of each subimage 204 by CNN1 module 214 can be very fast, the overall processing time for processing the set of subimages 204 also can be quite fast. The outputs of multiple applications of CNN1 module 214 contain an array of feature maps 206 corresponding to the set of subimages 204 after multiple layers of convolution, ReLU, and pooling operations.

Note that although the embodiment shown in FIG. 2B is based on reusing a single hardware CNN1 module 214 in the first processing stage 220 of CNN system 210, other embodiments can use additional hardware CNN1 modules similar or identical to CNN1 module 214 in the first processing stage 220 of CNN system 210, so that the set of subimages 204 can be processed in parallel by the multiple hardware CNN1 modules. The actual number of CNN1 modules used by a given design can be determined based on the trade-off between hardware cost constraint and speed requirement. For example, some variations to CNN system 210 can include 3 to 5 CNN1 modules in the first processing stage.

As mentioned above, CNN1 module 214 can be implemented by either a dedicated hardware submodule CNN1 such as those described in conjunction with FIGS. 1A and 1B or by the entire CNN module 100 described in conjunction with FIGS. 1A and 1B which includes both CNN1 and CNN2 submodules. In the first scenario, CNN1 module 214 within CNN system 210 can include only CONV, ReLU, and pooling layers. In the second scenario, implementing CNN1 module 214 in CNN system 210 further includes bypassing the FC layers and the corresponding ReLU layers, i.e., bypassing the submodule CNN2 within CNN module 100. When bypassing the CNN2 submodule, it is necessary for the CNN1 module 214 to preserve the spatial location information in its output feature maps, because the outputs from the CNN1 module 214 will be merged for further processing. For some built-in hardware CNN modules, such as a hardware CNN module within Hi3519 SoC, the parameters of the built-in CNN module are reconfigurable. Using this property, bypassing the submodule CNN2 when such a built-in hardware CNN module is used can be achieved by forcing each of the FC layers within CNN module 100 to be an identity matrix, so that the output from each of the FC layer is simply a reorganization of the two-dimensional feature maps into a one-dimensional vector. The ReLU layer after each FC layer can be applied as usual. In a partition embodiment, for a three FC-ReLU-layer CNN2 submodule configuration, the last two ReLU layers do not change any data, because the concatenation of multiple ReLU layers is equivalent to just one ReLU layer.

Referring back to FIG. 2B, after sequentially applying CNN1 module 214 to each of the set of subimages 204, the outputs from CNN1 module 214 containing the array of feature maps 206 become the inputs to merging module 222 which is configured to merge the array of feature maps 206 to form the full feature maps of the entire input image 202. The merged feature maps can then be used as the inputs to the second processing stage 224 of CNN system 210. In some embodiments, the output 228 from the second processing stage 224 is the output from the last FC layer of CNN2 module 216. Ideally, output 228 is identical to the output 226 of the conventional CNN system 200 in FIG. 2A.

In some embodiments, the array of feature maps 206 includes a set of three-dimensional (3D) matrices (i.e., two dimensions for a given feature map and one dimension for the number of feature maps). For example, the array of feature maps 206 can be composed of nine (i.e., a 3×3 array of) 3D matrices of 2×2×48 sizes, wherein nine is the number of subimages 204 having indices of 0, 1, 2, . . . , 8 (i.e., subimages of 3 rows by 3 columns), 2×2 is the size of a single output feature map after CNN1 module 214 for each subimage, and 48 is the number of feature maps for each subimage. In some embodiments, merging module 222 is configured to merge the array of feature maps 206 by concatenating the set of 3D output matrices based on the corresponding indices to form a merged 3D feature-map matrix, while preserving the spatial relationships of the set of subimages 204. In the above example, this step generates a 3D matrix of 6×6×48. Next, the merged 3D matrix can be flattened into a one-dimensional (1D) vector. In the above example, this creates a 1D vector having a size of 1728. Finally, the flattened 1D vector is fed into the second processing stage 224.

FIG. 2B shows that the merged feature maps 208 generated by merging module 222 are fed into the second processing stage 224 of CNN system 210 for further processing. More specifically, the second processing stage 224 of CNN system 210 includes at least one CNN2 module 216, which further includes a set of FC layers and ReLU layers as described above. As mentioned above, CNN2 module 216 in CNN system 210 can be implemented by a dedicated hardware submodule CNN2 described in conjunction with FIGS. 1A and 1B. In these embodiments, CNN2 module 216 within CNN system 210 can include only FC layers and ReLU layers. In some embodiments, CNN2 module 216 can be implemented by taking an entire hardware CNN module 100 described in FIGS. 1A and 1B which includes both CNN1 and CNN2 submodules. In these embodiments, implementing CNN2 module 216 in CNN system 210 further includes bypassing the CONV-ReLU-pooling layers, i.e., bypassing the submodule CNN1 within CNN module 100. In some systems such as Hi3519, it may be difficult to bypass the CONV-ReLU-pooling layers to use the FC layers and ReLU layers directly. In these cases, CNN2 module 216, i.e., the FC layers and ReLU layers can be implemented by software. Because most of the computational complexity of CNN system 210 is in the CONV layers, implementing the FC and ReLU layers in software typically has minor effect on the overall speed of the system. Furthermore, systems such as Hi3519 also provide additional tools to optimize the speed of such a software implementation.

As mentioned above, CNN2 module 216 within the second processing stage 224 can be implemented by software instead of a hardware CNN module. Note that most of the computational complexity of CNN system 210 is in the convolution layers implemented by CNN1 module 214 because the complexity of the FC layers and ReLU layers are generally much lower than the convolution layers. As a result, the low computational complexity operations implemented by the hardware CNN2 module 216 in CNN system 210 can be implemented by software in place of hardware CNN2 or CNN modules mentioned above. Moreover, such a software approach can provide more flexibilities than the embodiments based on the hardware CNN modules.

The Proposed Face Detection CNN Architecture

Of the two aforementioned face detection frameworks, the MTCNN has a simpler structure than the cascaded CNN because the MTCNN uses three CNN stages compared to the six stages used by the cascaded CNN. Moreover, the MTCNN can detect the facial landmark locations, which are useful to track a person and decide the pose of each face. Consequently, various examples of the proposed face detection CNN system and technique described below are based on the MTCNN framework which uses three stages. However, it should be noted that the proposed face detection CNN system and technique can also be applied to the cascaded CNN framework.

It has been mentioned above that the built-in CNN module in Hi3519 cannot be directly used to implement each stage of the MTCNN in the original design without resolving the input image size constraints of the built-in CNN module. In fact, the original design of the MTCNN violates and is in confliction with many constraints of the built-in CNN module in Hi3519. These conflicts include, but are not limited:

Maximum input image size: as mentioned above, in Hi3519, the maximum number of pixels in the input image supported by Hi3519 is 1280. In contrast, in the original design of the MTCNN, the input image size to the second stage is 24×24×3=1728, and the input image size to the third stage is 48×48×3=6912. Both of input sizes exceed the input image size limit of Hi3519.

Minimum input image size: in Hi3519, the minimum width or height of an input image is 16 pixels. In contrast, in the original design of the MTCNN, the input image size to the first stage is 12×12, which is too small for Hi3519.

Number of filters: in the built-in CNN module in Hi3519, the maximum number of filters in each of the convolutional (CONV) layers is 50. In contrast, several CONV layers in the original design of the MTCNN have 64 or 128 filters.

CNN architecture: in the built-in CNN module in Hi3519, each CONV layer is followed by a Max Pooling (MP) layer. However, the MTCNN usually uses two or three consecutive CONV layers without any MP layers between them.

Pooling window size: in the built-in CNN module in Hi3519, the MP layer is designed to support pooling window size of 2×2 pixels, whereas in the MTCNN, 3×3 max pooling windows are frequently used.

CONV layer filter size: in the built-in CNN module in Hi3519, the CONV layers use 3×3 filters, whereas in the MTCNN, the CONV layers usually use 5×5 filters and 2×2 filters.

Non-linear function: the MTCNN uses parametric rectified linear unit (PReLU) as the non-linear function, whereas the built-in CNN module in Hi3519 uses rectified linear unit (ReLU).

Fully connected (FC) layer: the first stage of the original design of the MTCNN is a fully convolutional network (FCN) to reduce the running time of the sliding window approach during testing, where there is no FC layer involved. In contrast, Hi3519 requires at least 3 FC layers in a CNN.

Various examples of the proposed face detection CNN system and technique are designed to resolve the above-mentioned conflicts so that the original CNN within each stage of the MTCNN can be implemented with a small-scale low-cost CNN module, such as the built-in CNN module in Hi3519.

Figure 3:
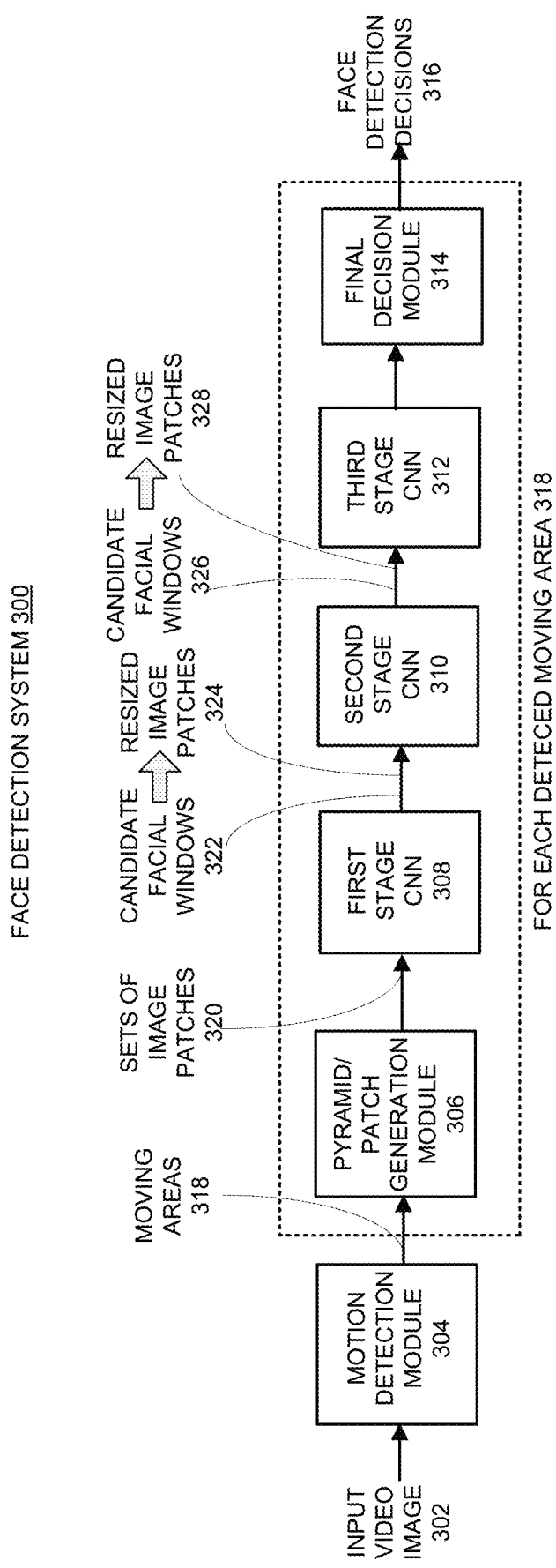
FIG. 3 shows a block diagram of an exemplary face detection system based on a small-scale hardware CNN module in accordance with some embodiments described herein.

FIG. 3 shows a block diagram of an exemplary face detection system 300 based on a small-scale hardware CNN module in accordance with some embodiments described herein. In some embodiments, face detection system 300 is implemented on a CNN-enabled embedded system including a small-scale low-cost SoC, such as Hi3519 SoC. As shown in FIG. 3, face detection system 300 receives a video image 302 as input and generates face detection decisions 316 as output. In some embodiments, input video image 302 is a video frame of a video captured by a camera. Note that face detection system 300 includes at least a motion detection module 304, a pyramid and patch generation module 306, a first stage CNN 308, a second stage CNN 310, a third stage CNN 312 and a final decision module 314. Face detection system 300 can also include additional modules not shown in FIG. 3. We now describe each of the blocks in face detection system 300 in more detail.

As can be seen, input video image 302 is first received by motion detection module 304. In some embodiments, it is assumed that a human face within a given video is associated with a motion. Hence, to reduce the computational complexity, motion detection module 304 can be used to locate and identify those areas within each video frame which are associated with motions based on comparisons with previously received video frames. Note that these moving areas can include both human objects and non-human objects such as a moving vehicle. Moreover, for a moving human object, a moving area can include both the human face and the human body. When face detection system 300 is implemented on Hi3519, motion detection module 302 can be implemented with the built-in motion detection hardware module within Hi3519. The output from motion detection module 302 includes a set of identified moving areas 318 which can have different sizes. Each identified moving area 318, which is a portion of the input video image 302, is then sent to the subsequent face detection modules within face detection system 300 to detect most or all faces within the moving area. In this embodiment, a non-moving area within input video image 302 is typically not considered for face detection. However, some other embodiments of the proposed face detection system can be constructed without a motion detection module.

In some embodiments, motion detection module 302 can be replaced by or combined with a face tracking module (not shown) which is configured to compute the trajectories of detected faces by face detection system 300. More specifically, a face tracking module can be configured to compute the trajectories based on the face locations in the previous video frames, predict the new locations of the detected faces in a new video frame based on the computed trajectories, and subsequently search these faces in the vicinity of the predicted locations. Note that by combining motion detection and face tracking within face detection system 300, the face detection speed can be significantly increased.

In some embodiments, the size of a given moving area 318 generated by motion detection module 304 (or by a face tracking module, or by a combination of motion detection and face tracking) has a minimum value. The minimum size of the moving area can be determined based on one or more design parameters as well as the constraints of the small-scale hardware CNN module used in face detection system 300, such as Hi3519. In some embodiments, the one or more design parameters include an initial downsampling factor specified for pyramid and patch generation module 306 and a minimum input image size of first stage CNN 308. For example, if the initial downsampling factor of pyramid and patch generation module 306 is 2:1 and the minimum input image size of first stage CNN 308 is 16×16, the minimum size of a detectable face would be 32×32. As another example, if the initial downsampling factor of the pyramid and patch generation module 306 is 3:1 and the minimum input image size of first stage CNN 308 is 16×16, the minimum size of a detectable face would be 48×48. To reduce the complexity, usually the minimal size of the moving area 318 that is sent to the face detection modules is greater than the minimal detectable face size. In some embodiments, the maximum size of a moving area generated by motion detection module 304 can be as large as the entire input video image 302. For example, such a moving area can be corresponding to an input image substantially fully occupied by a human face.

As can be seen in FIG. 3, each of the detected moving areas 318 generated by motion detection module 304 (or by a face tracking module, or by a combination of motion detection and face tracking) is processed in a similar manner by the other modules within face detection system 300, including pyramid and patch generation module 306, first stage CNN 308, second stage CNN 310, the third stage CNN 312 and the final decision module 314. Hence, the operations described below associated with pyramid and patch generation module 306, first stage CNN 308, second stage CNN 310, the third stage CNN 312 and the final decision module 314 are repeated for each of the detected moving areas 318. This process loop over all of the detected moving areas 318 is indicated by a dashed box placed around these modules. Hence, the following discussion on face detection system 300 is directed to and equally applicable to all of the detected moving areas 318.

Next in face detection system 300, each detected moving area 318, which is a portion of input video image 302, is received by pyramid and patch generation module 306. Pyramid and patch generation module 306 is configured to convert moving area 318 into a "pyramid" of multi-resolution representations of moving area 318 by downsampling moving area 318 with different downsampling factors, whereby allowing subsequent face detection modules to detect faces of different scales in moving area 318. More specifically, a higher-resolution representation of the moving area 318 in the "pyramid" can be used to detect smaller faces in the original input image 302, while a lower-resolution representation of moving area 318 in the "pyramid" can be used to detect larger faces in the original input image 302.

In some embodiments, the highest resolution representation of moving area 318 in the pyramid is determined by the input size of first stage CNN 308 and a desired minimum size of the faces that can be detected. Note that the input size of first stage CNN 308 can be a user-defined parameter, but the minimum values of the input size are restricted by the minimum input size of first stage CNN 308, which can be device-specific constraints. For example, for the built-in CNN module in Hi3519 SoC, the minimum input size is 16×16. This constraint dictates that the input size of first stage CNN 308 needs to be at least 16×16. Moreover, the highest resolution representation will also determine the smallest face that can be detected by face detection system 300. More specifically, the smallest face that can be detected can be determined by multiplying the input size of first stage CNN 308 with the downsampling factor used by pyramid and patch generation module 306. For example, if 16×16 is used as the input size of first stage CNN 308, and an initial downsampling factor of 3 is used by pyramid and patch generation module 306, then the smallest face that can be detected will be 48×48. If an initial downsampling factor of 2 is used by pyramid and patch generation module 306 and 16×16 is used as the input size, then the smallest face that can be detected will be 32×32 instead.

Note that which downsampling factor is used by pyramid and patch generation module 306 is a consideration of trade-offs between face detection accuracy and speed. On the other hand, the initial downsampling factor can be determined as the ratio of the desired minimum size of the faces that can be detected to the input size of first stage CNN 308. For example, suppose that 16×16 is used as the input size of first stage CNN 308 and the desired minimum size of the faces that can be detected is around 48×48, then an initial downsampling factor of 3 should be used. In some embodiments, the user-specified input size of first stage CNN 308 can be greater than the minimum input size of first stage CNN 308, i.e., >16×16.

In some embodiments, the lowest resolution representation of the moving area 318 in the pyramid can be equal or close to but no smaller than the minimum input size of first stage CNN 308, which is 16×16 in Hi3519. For example, the lowest resolution representation of the moving area 318 can be a 24×24 image. Other resolution representations of the moving area 318 can be spaced between the lowest and the highest resolution representations in the pyramid, and typically spaced by a factor of 2:1 or 3:1 between the adjacent resolution representations.

For each received moving area 318, pyramid and patch generation module 306 generates a pyramid of multi-resolution representations of this moving area 318. In other words, pyramid and patch generation module 306 generates a set of images of different resolutions corresponding to the same portion of the original input video image 302. In some embodiments, rather than processing each image in the pyramid as a whole, first stage CNN 308 processes image patches based on a user-specified input size as mentioned above. For example, if input size of 16×16 is used, then each image in the pyramid is further partitioned into a set of 16×16 image patches.

In some embodiments, pyramid and patch generation module 306 is configured to partition each image in the pyramid into a set of image patches using a sliding window approach. More specifically, a set of image patches can be generated by stepping a sliding window of user-specified size, e.g., of 16×16 through each image in the pyramid with a user-specified stride, e.g., of 2 or 4 pixels in both row and column directions, such that one image patch is generated at each sliding window location. As a result, pyramid and patch generation module 306 generates and outputs sets of image patches 320 of the same size corresponding to the set of multi-resolution representations of the moving area 318. Note that a higher resolution representation of moving area 318 can produce significantly more image patches than a lower resolution representation of moving area 318. Next, the sets of image patches 320 are received by first stage CNN 308. Depending on the hardware configuration, first stage CNN 308 can process the received image patches 320 in a sequential order one image patch at a time or process multiple image patches in parallel to speed up the processing speed. We now describe some embodiments of first stage CNN 308 in more detail.

Figure 4:
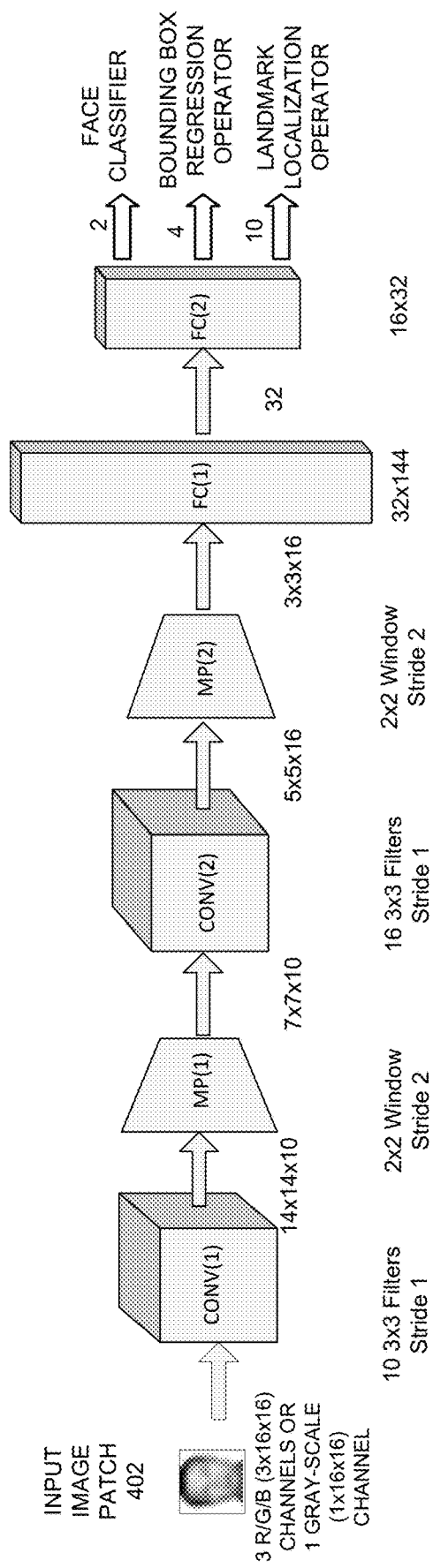
FIG. 4 shows a block diagram of an exemplary implementation of the first stage CNN shown in FIG. 3 based on a small-scale hardware CNN module in accordance with some embodiments described herein.

First stage CNN 308 is used to process each received image patch corresponding to each sliding window location within each pyramid representation of the moving area 318. FIG. 4 shows a block diagram of an exemplary implementation 400 of first stage CNN 308 based on a small-scale hardware CNN module in accordance with some embodiments described herein.

As can be seen in FIG. 4, first stage CNN 400 includes two stages of CONV and MP layers (i.e., CONV(1)/MP(1) and CONV(2)/MP(2)), followed by two FC layers (i.e., FC(1) and FC(2)). In some embodiments, each of the CONV and FC layers (except for the last FC layer) is followed by a ReLU layer, which is not shown in FIG. 4. In some embodiments, the input to first stage CNN 400 includes 3 R/G/B channels of an input image patch 402 (i.e., one of the sets of image patches 320 in FIG. 3), each channel of size 16×16. In other embodiments, the input to first stage CNN 400 includes a gray-scale image (i.e., a single channel) of an input image patch 402. For a given input image patch 402, using an associated gray-scale image can entail shorter processing time than using 3 R/G/B channels. Hence, using the gray-scale image can be advantageous over using 3 R/G/B channels per input image if the performances associated with the two types of inputs are substantially the same. In the embodiment shown, CONV(1) layer includes 10 3×3 filters of stride 1. Hence, the output of CONV(1) layer has a dimension of 14×14×10. The MP(1) layer uses 2×2 pooling windows with a stride of 2. Hence, the output of MP(1) layer has a dimension of 7×7×10. The CONV(2) layer includes 16 3×3 filters of stride 1. Hence, the output of CONV(2) layer has a dimension of 5×5×16. The MP(2) layer uses 2×2 pooling windows with a stride 2. Hence, the output of MP(2) layer has a dimension of 3×3×16. The outputs of the first and last FC layers are 32×1 and 16×1 vectors, respectively. In some embodiments, in the final 16×1 output vector, the first 2 outputs are used to generate the face detection confidence score (also referred as to as "face classifier"); the next 4 outputs are the bounding box coordinates (also referred as to as "bounding box regression operator") of the face in the image patch 402 (i.e., if a face is detected in the image patch 402); and the last 10 outputs indicate the locations of 5 facial landmark points of the detected face, i.e., left eye, right eye, nose, and two corners of the mouth (also referred as to as "landmark localization operator"). Hence, first stage CNN 400 outputs a set of candidate facial windows/bounding boxes corresponding to a subset of the image patches 320 shown in FIG. 3.

Note that the combination of the numbers of layers and filters, input image size, filters and pooling window sizes, FC layer output sizes, and other parameters shown in first stage CNN 400 is merely one exemplary configuration of first stage CNN 308. Many other configurations of first stage CNN 308 can be constructed which use one or more different parameter values from those shown in FIG. 4 without departing from the scope of the described technology. In some embodiments, first stage CNN 308, such as the exemplary first stage CNN 400 shown in FIG. 4 is configured to meet the constraints of a small-scale hardware CNN module, such as the built-in hardware CNN module within Hi3519, and therefore can be implemented by the built-in hardware CNN module within Hi3519.

In some embodiments, to eliminate more "false alarms" from those image patches detected as faces by first stage CNN 308 but are not actually faces, a filter can be applied to the face detection confidence scores in the detection outputs to only keep those input image patches with face detection confidence scores greater than a threshold values (e.g., a typical threshold value can be set between 0.5~0.7). In some embodiments, this filtering operation is implemented in first stage CNN 308 after the last FC layer.

Note that as a result of generating multi-resolution representations using the pyramid technique and image patches with the sliding window technique, many or multiple overlapping but non-identical bounding boxes can be generated around each face in the input image. In some embodiments, for each image block that is classified by first stage CNN 308 as a face, a corresponding image region in the original input video image 302 is identified. Next, a non-maximum suppression (NMS) technique can be used to merge those highly overlapped bounding boxes, as described in the MTCNN. Note that this NMS operation can be performed after the aforementioned filtering operation on the candidate facial windows. In some embodiments, the NMS operation is implemented in first stage CNN 308 within face detection system 300. After the NMS operation, the remaining bounding boxes can be refined through a bounding box regression operation to refine the bounding box locations, as also described in the MTCNN. Again, this NMS operation can be implemented in first stage CNN 308 within face detection system 300. Hence, after one or more additional processing, first stage CNN 308 outputs a set of candidate bounding boxes of faces, or "candidate facial windows."

In some embodiments, for each candidate facial window 322 output by first stage CNN 308, a corresponding image patch is located and cropped from the original input video image 302, and the cropped image patch is subsequently resized to a user-specified input size of second stage CNN 310. Based on the coarse-to-fine approach, this input size should be larger than the input size of first stage CNN 308. In some embodiments, second stage CNN 310 is configured with an input size of 24×24. As a result, the resized image patches also have the size of 24×24. However, other embodiments of second stage CNN 310 can use similar but slightly different input sizes from 24×24 without departing from the scope of the described technology. The process of generating resized image patches from candidate facial windows 322 can be implemented in hardware, in software, or in a combination of hardware and software. The corresponding processing module can be positioned between first stage CNN 308 and second stage CNN 310 and is not explicitly shown. Next, the resized image patches are received by second stage CNN 310. Depending on the hardware configuration, second stage CNN 310 can process the received resized image patches 324 in a sequential order one image patch at a time or process multiple image patches in parallel to speed up the processing speed. We now describe some embodiments of second stage CNN 310 in more detail.

Figure 5:
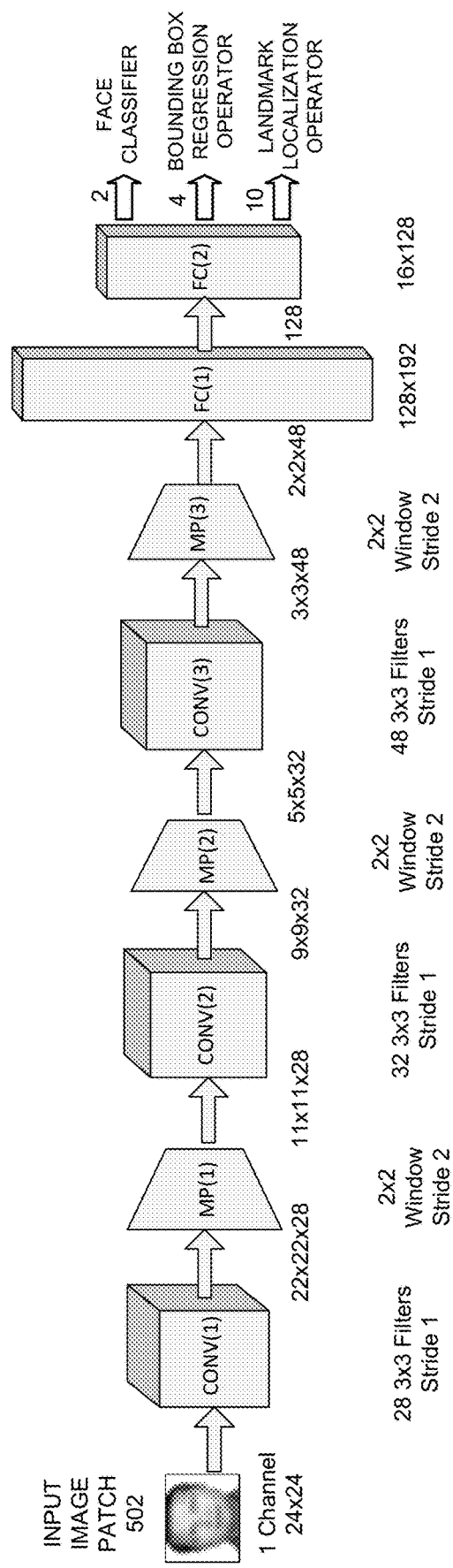
FIG. 5 shows a block diagram of an exemplary implementation of the second stage CNN shown in FIG. 3 based on a small-scale hardware CNN module in accordance with some embodiments described herein.

FIG. 5 shows a block diagram of an exemplary implementation 500 of second stage CNN 310 based on a small-scale hardware CNN module in accordance with some embodiments described herein.

As can be seen in FIG. 5, second stage CNN 500 includes three stages of CONV and MP layers (i.e., CONV(1)/MP(1), CONV(2)/MP(2) and CONV(3)/MP(3)), followed by two FC layers (i.e., FC(1) and FC(2)). In some embodiments, each of the CONV and FC layers (except for the last FC layer) is followed by a ReLU layer, which is not shown in FIG. 5. In some embodiments, second stage CNN 500 is configured to meet the constraints of the built-in hardware CNN module in Hi3519. For example, the input to second stage CNN 500 is a single channel of gray scale image 502 (i.e., one of the resized image patches 324 in FIG. 3) of size 24×24×1, instead of an RGB image of size 24×24×3 used in the second stage CNN in MTCNN. This is because the maximum input size supported by Hi3519 is 1280 pixels (<24×24×3=1728). However, experimental results show that the performance impact of using gray scale image instead of color image is insignificant. As a result, second stage CNN 500 can be efficiently implemented by a small-scale hardware CNN such as the embedded CNN within Hi3519.

In the embodiment shown, CONV(1) layer includes 28 3×3 filters of stride 1. Hence, the output of CONV(1) layer has a dimension of 22×22×28 (based on the input image size of 24×24). The MP(1) layer uses 2×2 pooling windows with a stride of 2. Hence, the output of MP(1) layer has a dimension of 11×11×28. The CONV(2) layer includes 32 3×3 filters of stride 1. Hence, the output of CONV(2) layer has a dimension of 9×9×32. The MP(2) layer uses 2×2 pooling windows with a stride 2. Hence, the output of MP(2) layer has a dimension of 5×5×32. The CONV(3) layer includes 48 3×3 filters of stride 1. Hence, the output of CONV(3) layer has a dimension of 3×3×48. The MP(3) layer uses 2×2 pooling windows with a stride 2. Hence, the output of MP(3) layer has a dimension of 2×2×48. The outputs of the first and last FC layers are 128×1 and 16×1 vectors, respectively. Note that although each of the CONV layers uses more filters than those used in first stage CNN 400 and the sizes of the FC layers are also bigger than those used in first stage CNN 400, second stage CNN 500 is still designed to meet the constraints of the built-in CNN module in Hi3519.

As can be seen, the output of the final FC layer in second stage CNN 500 is still an 16×1 output vector, with the first 2 outputs used to generate the face detection confidence score or face classifier; the next 4 outputs are the bounding box coordinates or the bounding box regression operator of the face in the input image patch 502 (i.e., if a face is detected in the image patch 502); and the last 10 outputs indicate the locations of 5 facial landmark points of the detected face, i.e., left eye, right eye, nose, and two corners of the mouth, i.e., landmark localization operator. However, because the input image resolution in second stage CNN 500 is higher than the input image resolution in first stage CNN 400, and CNN 500 is more powerful than CNN 400, the face detection accuracy of CNN 500 is also higher than the accuracy of CNN 400. Hence, second stage CNN 500 outputs a set of candidate facial windows/bounding boxes (shown as candidate facial windows 326 in FIG. 3) corresponding to a subset of the input image patches 502.

Similar to first stage CNN 308, a confidence score threshold can be applied to the face detection confidence scores in the detection outputs of second stage CNN 310 to only keep those input image patches with face detection confidence scores greater than the threshold value. In some embodiments, this filtering operation is implemented in second stage CNN 310 after the last FC layer. Similarly, after filtering the candidate bounding boxes, highly overlapped candidate bounding boxes can be merged using the aforementioned NMS technique. In some embodiments, this NMS operation is also implemented in second stage CNN 310. Typically, after the filtering and NMS operations, only a small subset of the candidate facial windows remains. After the NMS operation, the locations of the remaining bounding boxes can be refined through a bounding box regression operation, which can be implemented in second stage CNN 310.

Note that the combination of the numbers of layers and filters, size of the input image, sizes of the filters and pooling windows, FC layer output sizes, and other parameters shown in first stage CNN 500 is merely one exemplary configuration of second stage CNN 310. Many other configurations of second stage CNN 310 can be constructed which use one or more different parameter values shown in FIG. 5 without departing from the scope of the described technology. For example, instead of using an input size of 24×24 for second stage CNN 310, other similar sizes, e.g., 32×32 can be used instead. In some embodiments, second stage CNN 310, such as the exemplary second stage CNN 500 shown in FIG. 5 is configured to meet the constraints of a small-scale hardware CNN module, such as the built-in hardware CNN module within Hi3519, and therefore can be implemented by the built-in hardware CNN module within Hi3519.

In some embodiments, for each of the candidate facial windows 326 output by second stage CNN 310, a corresponding image patch is located and cropped from the original input video image 302, and the cropped image patch is subsequently resized to a user-specified input size of third stage CNN 312. Based on the coarse-to-fine approach, this input size should be larger than the input sizes of both the first and second stage CNNs 308 and 310. In some embodiments, third stage CNN 312 is configured with an input size of 46×46. As a result, the resized image patches also have the size of 46×46. However, other embodiments of third stage CNN 312 can use similar but slightly different input sizes from 46×46 without departing from the scope of the described technology. The process of generating resized image patches from the candidate bounding boxes can be implemented in hardware, in software, or in a combination of hardware and software. The corresponding processing module can be positioned between second stage CNN 310 and third stage CNN 312 and is not explicitly shown. Next, the set resized image patches 328 is received by third stage CNN 312 for final refinement. Depending on the hardware configuration, third stage CNN 312 can process the received resized image patches 328 in a sequential order one image patch at a time or process multiple image patches in parallel to speed up the processing speed.

In principle, third stage CNN 312 should process the input image patches 328 in a similar manner as in first stage CNN 308 and second stage CNN 310. For example, FIG. 6 shows a block diagram of an exemplary implementation 600 of third stage CNN 312 in accordance with some embodiments described herein.

Figure 6:
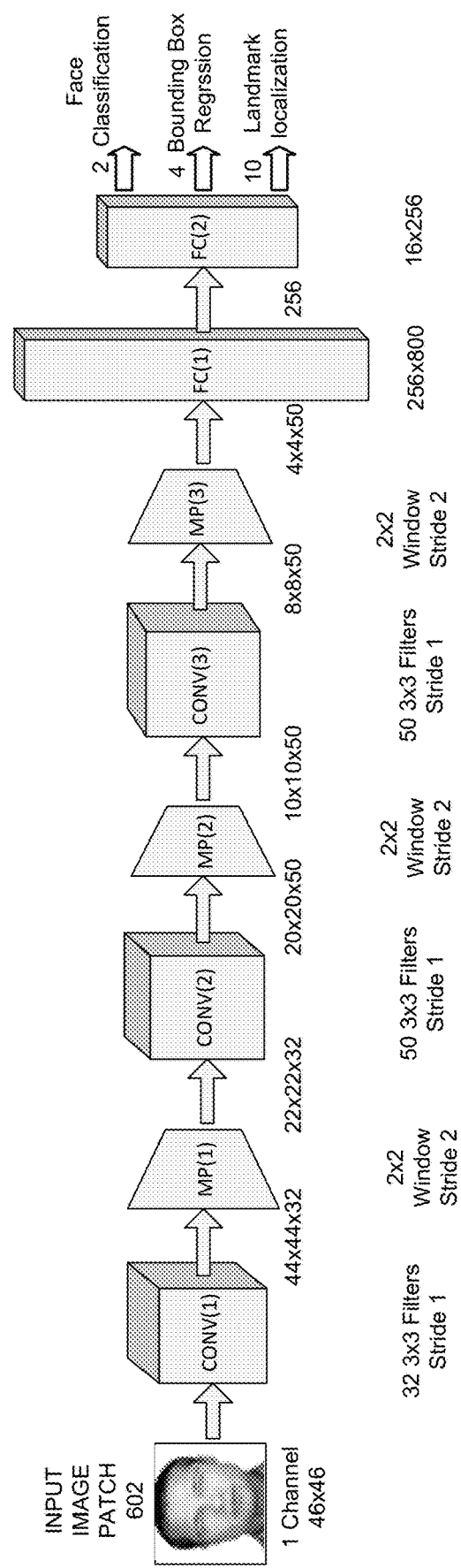
FIG. 6 shows a block diagram of an exemplary implementation of third stage CNN shown in FIG. 3 in accordance with some embodiments described herein.

As can be seen in FIG. 6, third stage CNN 600 also includes three stages of CONV and MP layers (i.e., CONV(1)/MP(1), CONV(2)/MP(2) and CONV(3)/MP(3)), followed by two FC layers (i.e., FC(1) and FC(2)). In the embodiment shown, CONV(1) layer includes 32 3×3 filters of stride 1. Hence, the output of CONV(1) layer has a dimension of 44×44×32 (based on the input image size of 46×46). The MP(1) layer uses 2×2 pooling windows with a stride of 2. Hence, the output of MP(1) layer has a dimension of 22×22×32. The CONV(2) layer includes 50 3×3 filters of stride 1. Hence, the output of CONV(2) layer has a dimension of 20×20×50. The MP(2) layer uses 2×2 pooling windows with a stride 2. Hence, the output of MP(2) layer has a dimension of 10×10×50. The CONV(3) layer includes 50 3×3 filters of stride 1. Hence, the output of CONV(3) layer has a dimension of 8×8×50. The MP(3) layer uses 2×2 pooling windows with a stride 2. Hence, the output of MP(3) layer has a dimension of 4×4×50. The outputs of the first and last FC layers are 256×1 and 16×1 vectors, respectively.

Note that the input image patch 602 (i.e., one of the resized image patches 328 in FIG. 3) has a size of 46×46×1=2116 (i.e., only a single channel of gray image is used) and in the above discussion of third stage CNN 600 it is necessary that the maximum input size of third stage CNN 600 is greater than 2116. However, if a CNN module has a maximum input size smaller than 2116, such a CNN module cannot be configured to implement third stage CNN 600. Consequently, the embodiment shown in FIG. 6, while may be useful during the design stage to optimize the network parameters, cannot be implemented with the built-in hardware CNN module in Hi3519 which only supports a maximum input size of 1280 pixels.

Figure 7:
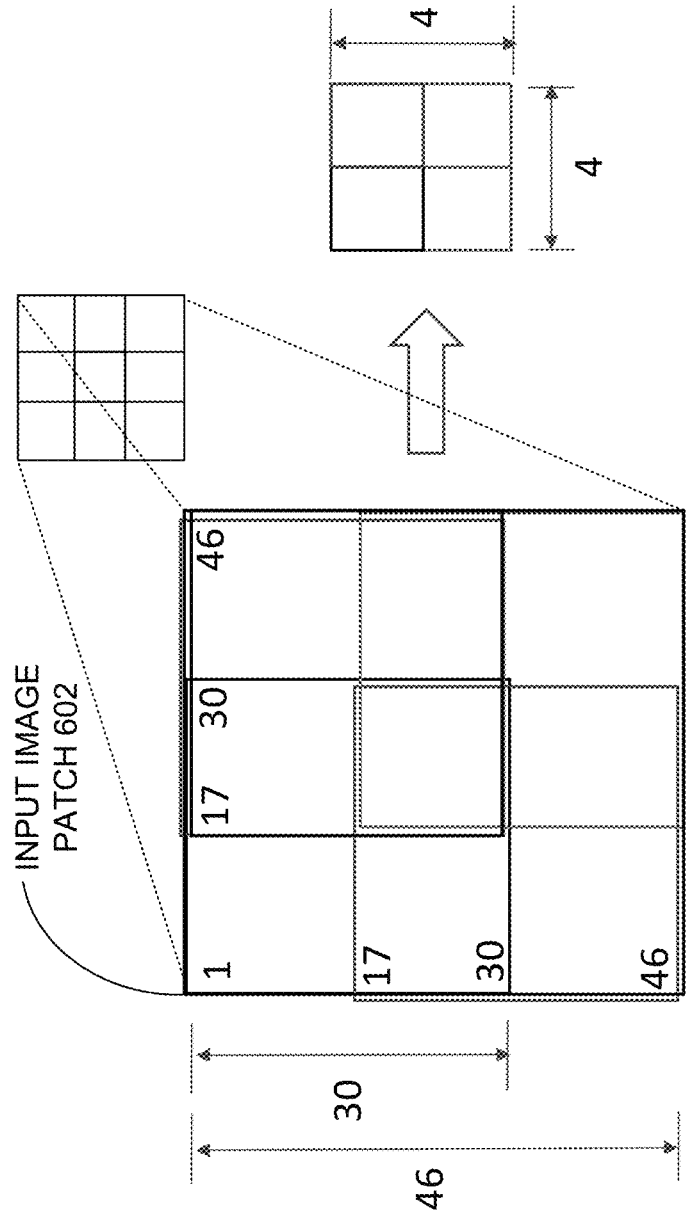
FIG. 7 shows an exemplary input image partition scheme for a 46×46 image patch in accordance with some embodiments described herein.

To resolve the above-described problem, the subimage-based CNN system and technique described in the related patent application can be used. More specifically, using the subimage-based CNN system and technique, the input image patch 602 can be partitioned into a set of overlapping subimages. For example, FIG. 7 shows an exemplary input image partition scheme for the 46×46 image patch in accordance with some embodiments described herein. As can be seen on the left side in FIG. 7, input image patch 602 is partitioned into a set of 4 overlapping subimages or patches, each having a size of 30×30, and a shift or a stride of 16 pixels between neighbouring subimages. Also note that in FIG. 7, small artificial offsets are used to slightly shift the four subimages from their overlapping configuration so that they can be better visualized and more easily distinguished from one another. However, these artificial offsets are only used for the purpose of visualizing these overlapping subimages and should not be construed as actual offsets between these subimages in an implementation. In fact, the row coordinates of these 4 subimages start at 1 and 17, respectively, and the column coordinates of the 4 subimages start at 1 and 17, respectively. The set of 4 overlapping subimages without the artificial offsets is shown as a smaller inset to the upper right corner of the main image with the artificial offsets.

Note that the specific values of input image size of 46×46, the subimage size of 30×30, and the stride size of 16×16 are all designed based on the theory described in the related patent application Ser. No. 15/441,194, the content of which is incorporated herein by reference. As described and proved in the related patent application, using these design values ensures that the merged output from the individual outputs of the 4 subimages is equivalent to the output from third stage CNN 600 if the entire input image patch 602 is processed by third stage CNN 600 as a whole without using the subimage-based CNN technique.

Figure 8:
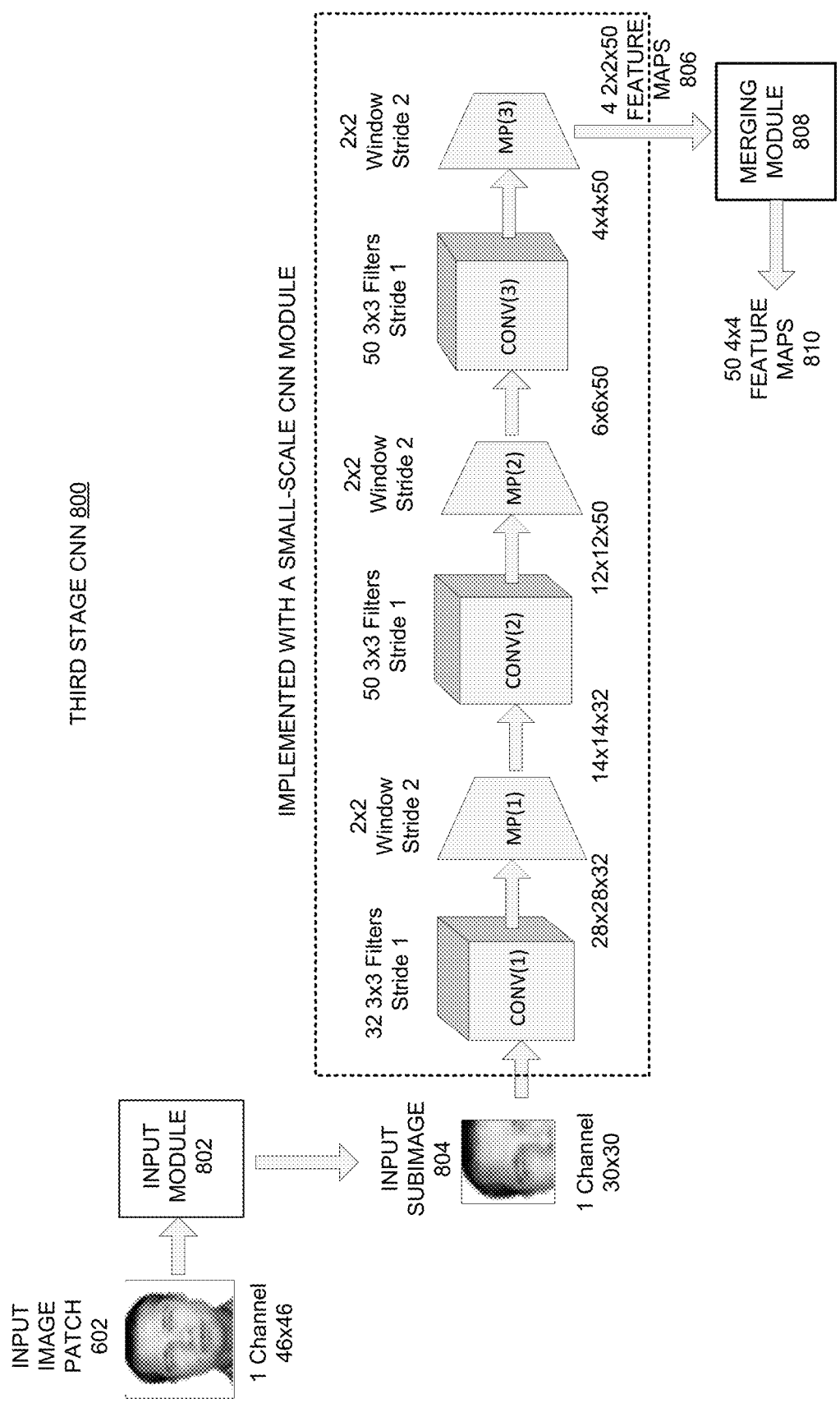
FIG. 8 shows a block diagram of an exemplary implementation of the third stage CNN shown in FIG. 3 based on a small-scale hardware CNN module in accordance with some embodiments described herein.

FIG. 8 shows a block diagram of an exemplary implementation 800 of third stage CNN 312 based on a small-scale hardware CNN module in accordance with some embodiments described herein. As can be seen in FIG. 8, third stage CNN 800 also includes three stages of CONV and MP layers (i.e., CONV(1)/MP(1), CONV(2)/MP(2) and CONV(3)/MP(3)) whose parameters are identical to those in the corresponding CONV and MP layers in third stage CNN 600. Third stage CNN 800 also includes an input module 802 which receives the 46×46 input image patch 602. Input module 802 is configured to partition image patch 602 into 4 subimages 804 of size 30×30, which is smaller than the maximum input image size supported by the built-in hardware CNN module in Hi3519. More detailed operation of input module 802 is described in the related patent application Ser. No. 15/441,194 (e.g., input module 212 in FIG. 2B), the content of which is incorporated herein by reference.

In some embodiments, the three stages of CONV and MP layers in third stage CNN 800 is configured to process the 4 subimages 804 in a sequential manner. As can be seen in FIG. 8, for a given 30×30 subimage 804 (which is clearly a portion/subimage of the image patch 602), CONV(1) layer includes 32 3×3 filters of stride 1. Hence, the output of CONV(1) layer has a dimension of 28×28×32. The MP(1) layer uses 2×2 pooling windows with a stride of 2. Hence, the output of MP(1) layer has a dimension of 14×14×32. The CONV(2) layer includes 50 3×3 filters of stride 1. Hence, the output of CONV(2) layer has a dimension of 12×12×50. The MP(2) layer uses 2×2 pooling windows with a stride 2. Hence, the output of MP(2) layer has a dimension of 6×6×50. The CONV(3) layer includes 50 3×3 filters of stride 1. Hence, the output of CONV(3) layer has a dimension of 4×4×50. The MP(3) layer uses 2×2 pooling windows with a stride 2. Hence, the output of MP(3) layer has a dimension of 2×2×50, i.e., 50 2×2 feature maps 806. For the set of 4 subimages 804, MP(3) layer generates outputs of 4 sets of 2×2×50 feature maps 806.

As shown in FIG. 8, third stage CNN 800 also includes a merging module 808 which is configured to receive and merge the 4 sets of 2×2×50 feature maps 806 to form the full feature maps of the full input image patch 602, i.e., the input to the third stage CNN 800. More detailed operation of merging module 808 is described in the related patent application Ser. No. 15/441,194 (e.g., merging module 222 in FIG. 2B), the content of which is incorporated herein by reference. As described in the related patent application, the output feature maps associated with the set of 4 subimages 804 have no overlap and no gap between adjacent feature maps corresponding to adjacent subimages, and can be merged directly to generate the same output as that of third stage CNN 600 in FIG. 6 before the first FC layer. The merged result, i.e., the output of third stage CNN 800 is a set of 50 4×4 feature maps 810, one of which is also illustrated on the right side in FIG. 7.

In some embodiments, the built-in hardware CNN in Hi3519 is used to implement the three stages of CONV and MP layers shown in third stage CNN 800. However, the built-in hardware CNN in Hi3519 also includes at least three FC layers. In one embodiment, to accommodate these FC layers required by Hi3519, two dummy FC layers configured with the identity matrix as their matrix parameters are included in third stage CNN 800 (not explicitly shown). Moreover, in Hi3519, there is also a ReLU layer after each FC layer. However, as disclosed in the related patent application, the ReLU layer does not affect the output of the dummy FC layer, because the concatenation of multiple ReLU layers is equivalent to just one ReLU layer.

Note that the input image size of third stage CNN 800 does not have to be 46×46. Other feasible sizes can be used as the input image size of third stage CNN 800, and the requirements for the feasible sizes have been described in the related patent application, the content of which is incorporated herein by reference. For example, another possible input image size to third stage CNN 800 can be 62×62. Using this image size, input image patch 802 can be partitioned into 9 overlapping subimages, each of which has a size of 30×30, and a stride of 16 between neighboring subimages in both horizontal and vertical directions.

Referring back to FIG. 3, if third stage CNN 312 in face detection system 300 is implemented as third stage CNN 800, third stage CNN 312 outputs the set of 50 4×4 feature maps 810, which is the input to final decision module 314. In some embodiments, final decision module 314 includes multiple FC layers configured to operate on the received feature maps and generate final decisions on the input video image 302, shown as face detection decisions 316 in FIG. 3.

Figure 9:
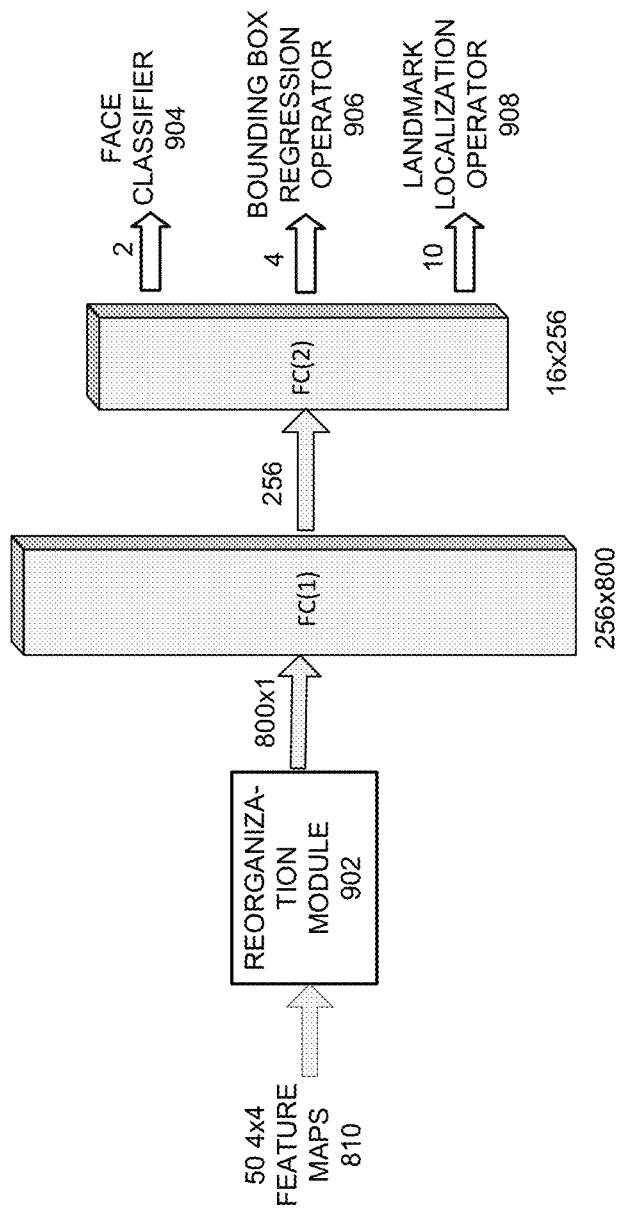
FIG. 9 shows a block diagram of an exemplary implementation of the final decision module shown in FIG. 3 in accordance with some embodiments described herein.

FIG. 9 shows a block diagram of an exemplary implementation 900 of final decision module 314 in accordance with some embodiments described herein. As can be seen in FIG. 9, the set of 50 4×4 feature maps 810 is received and processed by a reorganization module 902, which is configured to merge and reorganize of the set of 2D feature maps into a 1D vector of size 800×1. The 1D vector is further processed by two stages of FC layers FC(1) and FC(2), which subsequently output face detection decisions 316 for a given detected moving area 318. In some embodiments, the final FC layer FC(2) is implemented with a linear classifier such as a softmax classifier. In the embodiment shown, face detection decisions 316 can include face classifier 904, bounding box regression operator 906; and facial landmark localization operator 908. As mentioned above, landmark localization operator 908 within in face detection decisions 316 can include the locations of 5 facial landmark points of the detected face, i.e., left eye, right eye, nose, and two corners of the mouth. While the two FC layers within final decision module 900 have sizes of 256 and 16, respectively, other embodiments of final decision module 314 can have FC layer sizes different from those in final decision module 900. Note that final decision module 900 can be implemented in software and processed by the CPU on Hi3519 SoC, because final decision module 900 has much lower computational complex than each of the three stages of the CNNs 308, 310, and 312.

Figure 10:
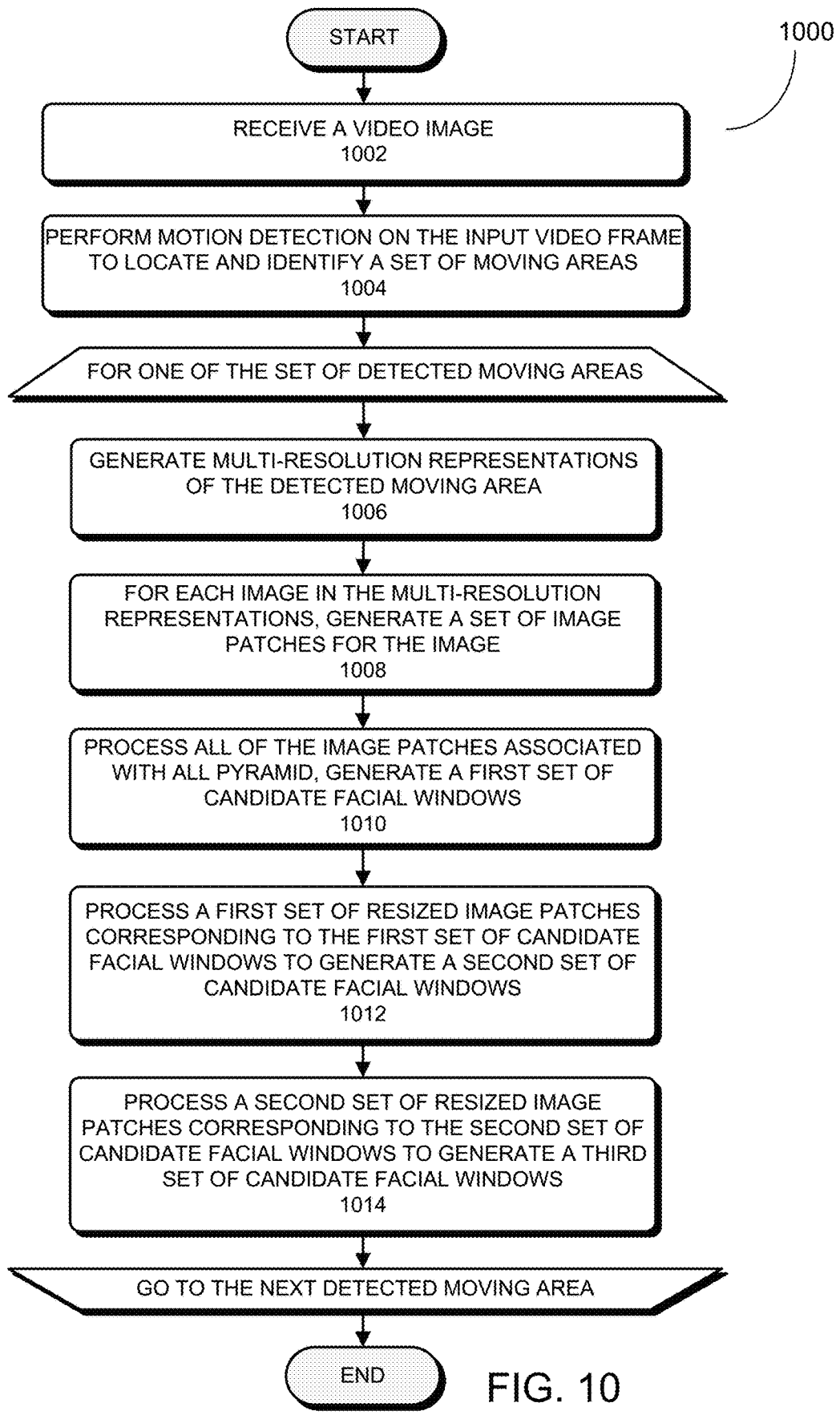
FIG. 10 presents a flowchart illustrating an exemplary face detection process using the disclosed face detection system implemented on a CNN-enabled embedded system in accordance with some embodiments described herein.

FIG. 10 presents a flowchart illustrating an exemplary face detection process 1000 using the disclosed face detection system 300 implemented on a CNN-enabled embedded system in accordance with some embodiments described herein. In some embodiments, the CNN-enabled embedded system includes a small-scale low-cost SoC, such as Hi3519 SoC. The face detection process 1000 begins when a video image/frame is received at the input of the disclosed face detection system (step 1002). In some embodiments, the video image is captured by a high-resolution camera, such as a surveillance camera, a machine vision camera, cameras on a self-drive car, or mobile phone cameras.

Next in face detection process 1000, a motion detection operation is performed on the input video image/frame to locate and identify a set of moving areas (i.e., image patches within the video frame associated with motions) within the video frame (step 1004). In some embodiments, the motion detection operation is implemented with a built-in background subtraction module within the CNN-enabled embedded system to detect those moving areas in the video image/frame. The output from the motion detection operation includes a set of identified moving areas within the video frame. In some embodiments, the motion detection operation is replaced by or combined with a face tracking operation. Note that by combining motion detection and face tracking in face detection process 1000, the face detection speed can be significantly increased. In some embodiments, the motion detection operation can be omitted from face detection process 1000.

Next in face detection process 1000, for each detected moving area, a pyramid generation operation is performed on the detected moving area to generate multi-resolution representations of the detected moving area (step 1006). More specifically, a higher-resolution representation of the detected moving area is to be used to detect smaller faces in the original input video image, while a lower-resolution representation of the detected moving area is to be used to detect larger faces in the original input video image.

Next in face detection process 1000, a sliding window operation is performed on each image in the multi-resolution representations to generate a set of image patches for the image (step 1008). In some embodiments, the size of the sliding window is determined based on a first input size of a first CNN processing stage configured with a first complexity level.

Next in face detection process 1000, the first CNN processing stage is used to process all of the image patches corresponding to each sliding window location within each multi-resolution representation of detected moving area to generate a first set of candidate facial windows (step 1010). In some embodiments, each of the first set of candidate facial windows is associated with a confident score and a set of bounding box coordinates. In some embodiments, each candidate facial window is also associated with 5 facial landmark points, i.e., left eye, right eye, nose, and two corners of the mouth. In some embodiments, the first CNN processing stage is configured to meet the constraints of a small-scale hardware CNN module, such as the built-in hardware CNN module within Hi3519, and therefore can be implemented by the built-in hardware CNN module within Hi3519.

Next in face detection process 1000, a second CNN processing stage is used to process a first set of resized image patches corresponding to the first set of candidate facial windows to generate a second set of candidate facial windows (step 1012). In some embodiments, the second CNN processing stage is configured with a second complexity level higher than the first complexity level. In some embodiments, the size of the first set of resized image patches is equal to a second input size of the second CNN processing stage, wherein the second input size is greater than the first input size of the first CNN processing stage. As a result, the second CNN processing stage processes higher resolution input image patches with higher face detection accuracy than the first CNN processing stage. In some embodiments, each of the second set of candidate facial windows is associated with a confident score and a set of bounding box coordinates. In some embodiments, each candidate facial window is also associated with 5 facial landmark points, i.e., left eye, right eye, nose, and two corners of the mouth. In some embodiments, the second CNN processing stage is configured to meet the constraints of a small-scale hardware CNN module, such as the built-in hardware CNN module within Hi3519, and therefore can be implemented by the built-in hardware CNN module within Hi3519.

Next in face detection process 1000, a third CNN processing stage is used to process a second set of resized image patches corresponding to the second set of candidate facial windows to generate a third set of candidate facial windows (step 1014). In some embodiments, the third CNN processing stage is configured with a third complexity level higher than both the first and the second complexity levels. In some embodiments, the size of the second set of resized image patches is equal to a third input size of the third CNN processing stage, wherein the third input size is greater than both the first and second input sizes of the first and second CNN processing stages. As a result, the third CNN processing stage processes higher resolution input image patches with higher face detection accuracy than both the first and second CNN processing stages. In some embodiments, each of the third set of candidate facial windows is associated with a confident score and a set of bounding box coordinates. In some embodiments, each candidate facial window is also associated with 5 facial landmark points, i.e., left eye, right eye, nose, and two corners of the mouth. Note that steps 1006 to 1014 are repeated for each detected moving area within the original input video frame.

In some embodiments, it is desirable to also implement the third CNN processing stage with a small-scale hardware CNN module, such as the built-in hardware CNN module within Hi3519. However, because the input size of the third CNN processing stage is generally greater than the maximum input size of such a small-scale hardware CNN module, a subimage-based CNN approach has to be used.

Figure 11:
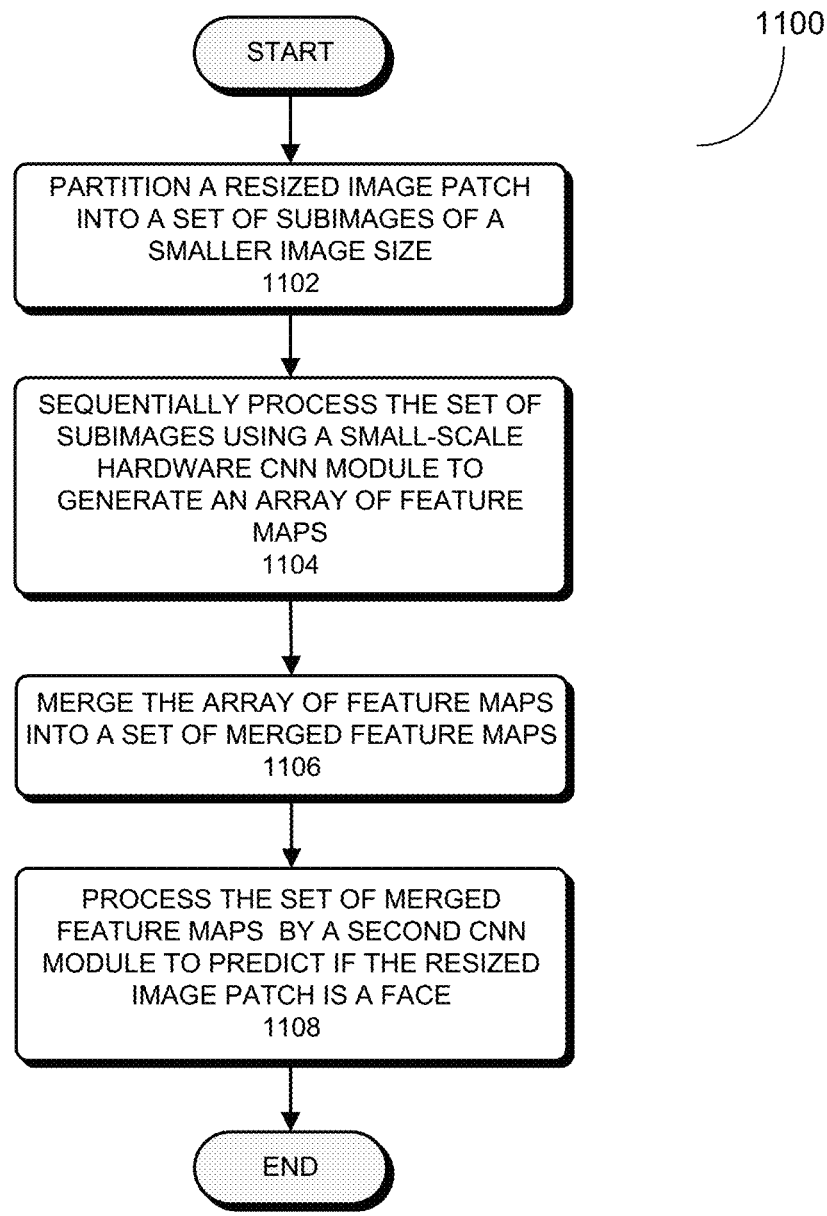
FIG. 11 presents a flowchart illustrating an exemplary process for processing the second set of resized image patches (i.e., step 1014 in FIG. 10) using the disclosed subimage-based CNN system in accordance with some embodiments described herein.

FIG. 11 presents a flowchart illustrating an exemplary process 1100 for processing the second set of resized image patches (i.e., step 1014 in process 1000) using the disclosed subimage-based CNN system in accordance with some embodiments described herein.

To begin, a given resized image patch is partitioned into a set of subimages of a smaller image size (step 1102). In some embodiments, the set of subimages includes a two-dimensional array of overlapping subimages. For example, a 46×46 image patch can be partitioned into a set of 4 overlapping subimages, each having a size of 30×30, and a shift of 16 pixels between neighbouring subimages. Moreover, the size of the subimages is smaller than the maximum input size of the small-scale hardware CNN module, such as the built-in hardware CNN module within Hi3519.

Next, the set of subimages are sequentially processed by the small-scale hardware CNN module to generate an array of feature maps (step 1104). In some embodiments, processing each of the subimages using the small-scale hardware CNN module includes applying multiple stages of CONV layers and MP layers on the subimage.

Next, the array of feature maps output by the small-scale hardware CNN module is merged into a set of merged feature maps (step 1106). More specifically, the set of merged feature maps are identical to the full feature maps for the entire high-resolution resized image patch generated by a large-scale CNN which processes the high-resolution resized image patch as a whole without partitioning the resized image patch. Next, the set of merged feature maps are processed by a second CNN module to predict if the resized image patch is a face (step 1108). In some embodiments, processing the set of merged feature maps includes applying multiple stages of FC layers on the set of merged feature maps.

Note that although various embodiments of the disclosed face detection system described above are directed to applying the subimage-based CNN technique to the last CNN stage of a cascaded CNN system, other embodiments of the disclosed face detection system can also apply the subimage-based CNN technique to more than one stage of a cascaded CNN system, e.g., to the last two stages of the cascaded CNN system.

Age and Gender Estimation Based on Face Images

Note that the abilities to automatically estimate age and gender of people captured in video images can be highly desirable features in many commercial applications, such as in retail, marketing, security surveillance, and social networking. For example, a security camera system installed in a retail store can use such features to automatically categorize the customers captured by the security camera based on the estimated gender and age groups to facilitate the retailer to better understand customer types, trends and behaviors. Hence, after detecting human faces from captured video images, CNNs can be applied to the detected face images to perform age and gender estimation.

Previously, a number of approaches for age and gender estimation using CNN have been disclosed. Rothe et al. ("Deep expectation of real and apparent age from a single image without facial landmarks," International Journal of Computer Vision (IJCV), July 2016) uses a 16-layer VGG neural network having 13 CONV layers and 3 FC layers to process input images of 256×256 resolution. In Levi et al. ("Age and gender classification using convolutional neural networks," IEEE Conf. on Computer Vision and Pattern Recognition (CVPR) workshops, June 2015), color images of 227×227 resolution are used. More specifically, the network in Levi contains three CONV layers, each followed by a rectified linear operator and a MP layer taking the maximal value of 3×3 regions. The first CONV layer contains 96 filters of 3×7×7 pixels, the second CONV layer contains 256 filters of 96×5×5 pixels, and the third CONV Layer contains 384 filters of 256×3×3 pixels, wherein the first two CONV layers also use a local response normalization layer. After the CONV layers, two FC layers each containing 512 neurons are used, and each of which is followed by a ReLU and a dropout layer. Further, a third FC layer is used to map the outputs to the final classes for age or gender classification. In Mall et al. ("Apparent age estimation using ensemble of deep learning models," CVPR 2016), an ensemble of VGG-based deep learning models is trained, and the outputs of these deep learning models are combined to produce the final estimation. In Yi et al. ("Age estimation by multi-scale convolutional network," Asian Conference on Computer Vision (ACCV), 2014), a multi-patch and multi-scale scheme is developed by fusing features of image patches with different sizes around some facial landmarks. Yi also showed that gender and age can be estimated jointly by the same network.

Note that similar to the above-described problem of implementing cascaded CNN framework for face detection on embedded systems integrated with small-scale low-cost CNN modules, the above-described age and gender estimation techniques are generally not suitable for some low-cost embedded systems based on small-scale hardware CNN modules due to the complexities of these techniques. For example, if one attempts to implement one of the above-described age and gender estimation techniques on the built-in CNN module of Hi3519 SoC, a multitude of constraints associated with Hi3519 built-in CNN module have to be taken into account. For example, as mentioned above, the maximum input image size, i.e., the maximum number of input pixels supported by the Hi3519 CNN module is 1280, which can be the result of the hardware configuration constraint of Hi3519. Hence, when gray-scale face images are used as input, and assuming face images are square images, the resolution of these face images has to be less than 36×36. When color face images have to be used, the maximum supported resolution will be even less. However, such a low resolution can significantly degrade the accuracy of the age and gender estimations, especially when the quality of a face image is further degraded by factors such as poor illumination, motion blur, and different poses.

Other constraints associated with the built-in CNN module in Hi3519 as a result of its specific design include, but are not limited to: (1) the width and height in pixels of the input image have to be even numbers; (2) the maximum number of CONV or FC layers is 8; (3) the maximum output dimension of a FC layer is 256; (4) the input dimension for the first FC layer cannot exceed 1024; (5) each of the CONV layers has to be followed by a MP layer; (6) the maximum number of filters in each CONV layer is 50; (7) in each MP layer, the built-in CNN module only supports pooling window size of 2×2 pixels; and (8) the built-in CNN module only supports 3×3 filters in CONV layers.

Despite of the various constraints associated with some low-cost embedded systems, it can be highly beneficial to integrate age and gender estimation capabilities in these systems to process detected faces in conjunction with the above-described face detection capabilities. For example, the ability to perform age and gender estimation in-situ within a surveillance camera system based on the captured and detected face images rather than using a separate server to perform such operations can significantly reduce operational cost. However, to ensure that the accuracy of the estimation is not compromised, original resolution of the detected face images should be used.

Hence, the proposed age and gender estimation system also uses the above-described subimage-based technique according to the divide-and-conquer principle on those detected face images having sizes greater than the maximum number of input pixels supported by a given small-scale CNN module. In some embodiments, using this subimage-based technique, the proposed age and gender estimation system can first divide a high-resolution input face image into a set of properly sized image patches (also referred to as "subimages") with judiciously designed overlaps among neighbouring patches. Each of the image patches can then be processed with a small-scale CNN module, such as the built-in CNN module in Hi3519. The outputs corresponding to the set of image patches can be subsequently merged to obtain the output corresponding to the high-resolution input face image, and the merged output can be further processed by subsequent layers in the age and gender estimation system to generate age and gender classifications for the input face image. In some embodiments, the proposed age and gender estimation system based on the subimage-based technique can be configured to be equivalent to a large-scale CNN that processes the entire high-resolution input face image without partitioning, and as such the output of the proposed subimage-based CNN system can be exactly identical to the output of the large-scale CNN.

Figure 12:
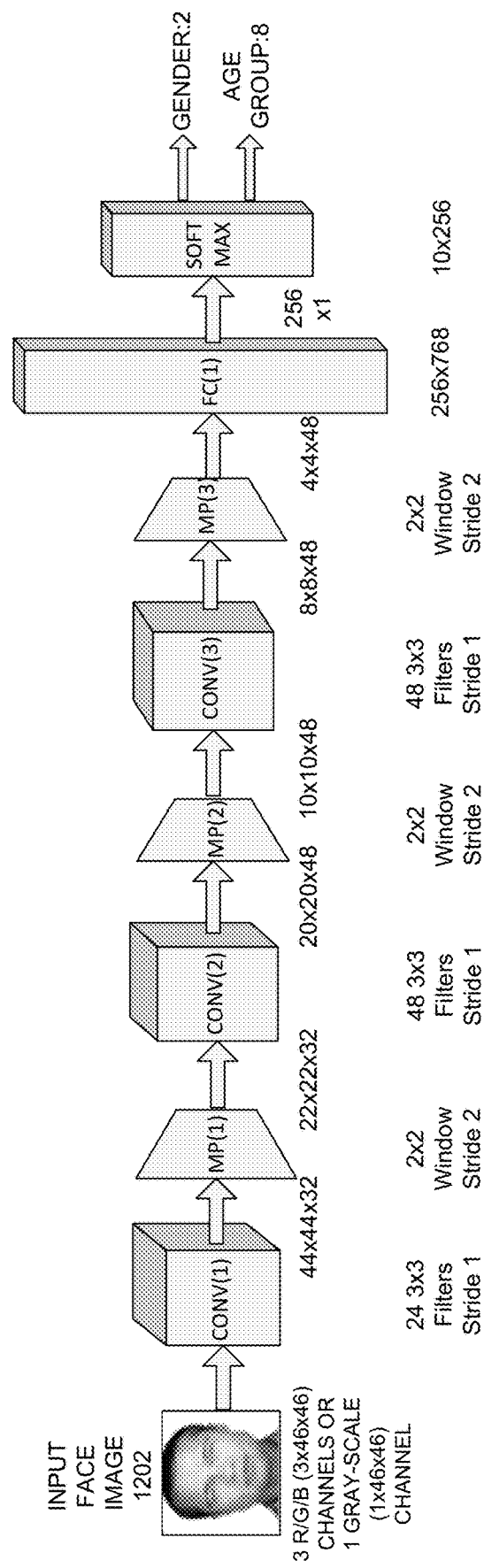
FIG. 12 shows a block diagram of an exemplary age and gender estimation neural network based on a small-scale CNN module in accordance with some embodiments described herein.

FIG. 12 shows a block diagram of an exemplary age and gender estimation neural network 1200 based on a small-scale CNN module in accordance with some embodiments described herein. As can be seen in FIG. 12, neural network 1200 receives an input face image 1202 having a size of 46×46 as input. As mentioned above, input face image 1202 can be represented by either 3 R/G/B channels each of the size of 46×46 or a single gray-scale image/channel of size 46×46. Input face image 1202 is then passed through 3 CONV layers (i.e., CONV(1)-CONV(3)), each of which is followed by a ReLU layer (not shown) and a MP layer (i.e., MP(1)-MP(3)). Note that each of the CONV layers uses 3×3 filters and each of the MP layers uses pooling window size of 2×2 pixels. These design parameters meet the constraints of some small-scale CNN modules such as Hi3519.

Following the CONV/ReLU/MP layers, an FC layer (i.e., FC(1)) and an output layer based on a softmax classifier (i.e., SOFTMAX) are used to make the final classifications/estimations for input face image 1202. Although the final output layer is shown as a softmax classifier, the final output layer of neural network 1200 can also be implemented using other types of classifiers suitable for deep learning applications. Note that the first two outputs of neural network 1200 (Gender: 2) are for the gender estimation, i.e., male and female probabilities. The next 8 outputs of neural network 1200 (Age Group: 8) correspond to the probabilities of up to 8 age groups, e.g., with age ranges of 0-2, 4-6, 8-13, 15-20, 25-32, 38-43, 48-53, 60 and above. Note that in applications where only gender or age group is needed, the neural network 1200 outputs can be simplified to only include the gender outputs or the age group outputs.

In some embodiments, age and gender estimation neural network 1200 can be used to train the network parameters with training face images. In some embodiments, these network parameters which are optimized through the training process can include the number of filters in each CONV layer, and weights and biases of the filters in each CONV layer, among others. Hence, the numbers shown in FIG. 12 can represent an exemplary configuration of a trained neural network 1200. More specifically, CONV(1) layer includes 24 3×3 filters of stride 1. Hence, for the input image 1202 of size 46×46, the output of CONV(1) layer has a dimension of 44×44×32. The MP(1) layer uses 2×2 pooling windows with a stride of 2. Hence, the output of MP(1) layer has a dimension of 22×22×32. The CONV(2) layer includes 48 3×3 filters of stride 1. Hence, the output of CONV(2) layer has a dimension of 20×20×48. The MP(2) layer uses 2×2 pooling windows with a stride 2. Hence, the output of MP(2) layer has a dimension of 10×10×48. The CONV(3) layer includes 48 3×3 filters of stride 1. Hence, the output of CONV(3) layer has a dimension of 8×8×48. The MP(3) layer uses 2×2 pooling windows with a stride 2. Hence, the output of MP(3) layer has a dimension of 4×4×48. Therefore, the input dimension to FC(1) layer is 768. The outputs of the FC(1) layer and the softmax classifier are 256×1 and 10×1 vectors, respectively.

In some embodiments, the above-described network parameters of the trained neural network 1200 meet the constraints of a given small-scale CNN module, such as the CNN module in Hi3519 SoC, so that neural network 1200 can be implemented by the given small-scale CNN module. However, other configurations of neural network 1200 can be constructed which use other numbers of CONV/ReLU/MP layers, filters and FC layer sizes different from those of neural network 1200 without departing from the scope of the described technology, so long as a given network configuration meets the constraints of the given small-scale CNN module, such as the one in Hi3519.

Note that the exemplary configuration of neural network 1200 which directly receives a 46×46 input image 1202 at the first CONV layer, can be used to train the network parameters with 46×46 training images during the design stage of the proposed age and gender estimation CNN system based on a small-scale CNN module. However, for the built-in hardware CNN module in Hi3519, the size of input face image 1202 is larger than the maximum number of input pixels supported by the built-in hardware CNN module. As a result, the exemplary configuration of neural network 1200 cannot be directly implemented on the built-in hardware CNN module in Hi3519 because the size of input image 1202 exceeds the maximum input image size allowed/supported by CONV(1) layer of the CNN module in Hi3519.

To resolve the above-described problem, the subimage-based CNN system and technique described in related patent application Ser. No. 15/441,194 can be used. More specifically, using the subimage-based CNN system and technique, the input face image 1202 can be divided into a set of properly sized subimages or image patches with judiciously designed overlaps among neighbouring patches. For a 46×46 input image, a proper partition scheme has been described in conjunction with FIG. 7. Hence, input face image 1202 can be partitioned into a set of 4 overlapping subimages or image patches, each having a size of 30×30, and a shift or a stride of 16 pixels between neighbouring subimages or image patches.

Note that while the example in FIG. 12 assumes a 46×46 image as the input to the proposed age and gender estimation CNN system, the detected face images cropped out of an original video or still image can have many different dimensions and sizes. For the simplicity of the discussion, it is assumed that the input face images are square images of the same width and height. While generally speaking the input face images can also include non-square images, the discussion below based on square images can be readily extended to non-square images.

Figure 13:
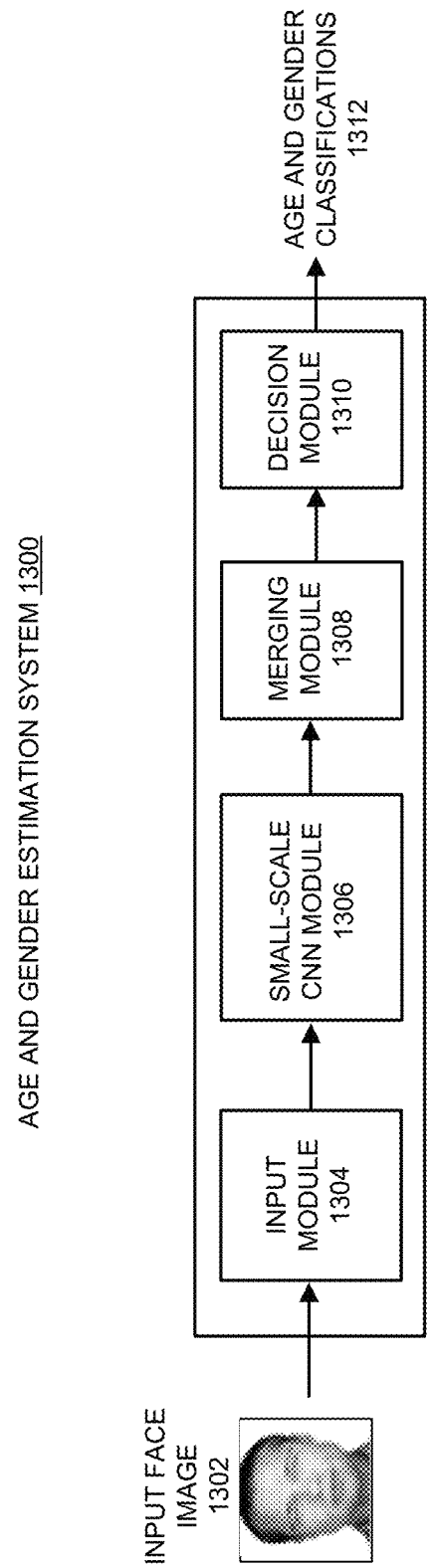
FIG. 13 shows a block diagram of an exemplary age and gender estimation system based on a small-scale hardware CNN module and a subimage-based technique in accordance with some embodiments described herein.

FIG. 13 shows a block diagram of an exemplary age and gender estimation system 1300 based on a small-scale hardware CNN module and a subimage-based technique in accordance with some embodiments described herein. In some embodiments, age and gender estimation system 1300 is implemented on a low-cost embedded system including a small-scale CNN module, e.g., by integrating a Hi3519 SoC. As shown in FIG. 13, age and gender estimation system 1300 receives an input face image 1302 as input and generates gender and age/age group classifications 1312 as outputs, i.e., the age and gender estimations for the person corresponding to input face image 1302. In some embodiments, input face image 1302 is an output of the above-described face detection system 300 that processes captured video images. Hence, input face image 1302 can be cropped out of an original video image, such as input video image 302. However, input face image 1302 can also be an original input image that includes primarily a human face. It is assumed here that input face image 1302 can have a size different from 46×46.

Age and gender estimation system 1300 includes at least an input module 1304, a CNN module 1306, a merging module 1308 and a classification module 1310. Input module 1304 is configured to perform the aforementioned subimage partitions so that input face image 1302 exceeding the maximum input size supported by a small-scale hardware CNN module can be divided into a set of subimages of a size no greater than the maximum input size of the small-scale hardware CNN module, so that the set of subimages can be individually processed by such a small-scale hardware CNN module. As such, CNN module 1306 can be implemented with such a small-scale hardware CNN module to process the smaller subimages. Merging module 1308 is configured to merge the outputs corresponding to the set of subimages to ensure that the merged result is identical to the result when the entire input face image 1302 is processed as a whole without using the subimage-based technique. Decision module 1310 is configured to map the outputs from merging module 1308 to the final classes for age or gender classification. Age and gender estimation system 1300 can also include additional modules not shown in FIG. 13. We now describe each of the blocks in age and gender estimation system 1300 in more detail.

As shown in FIG. 13, input module 1304 receives input face image 1302. Input module 1304 is configured to determine if the size of input face image 1302 is smaller than or equal to the maximum input image size of CNN module 1306. For example, if CNN module 1306 is implemented with the small-scale CNN module in Hi3519, the maximum input image size supported by CNN module 1306 is 1028, and input module 1304 compares the size of the input image 1302 with 1028. In some embodiments, if the size of input face image 1302 is smaller than or equal to the maximum input image size of CNN module 1306, input module 1304 is configured to pass input face image 1302 directly to CNN module 1306 without performing any subimage operations. However, in some other embodiments, if the size of input face image 1302 is smaller than or equal to the maximum input image size of CNN module 1306, input module 1304 is configured to resize (e.g., by upsampling) input face image 1302 to a predetermined input image size that meets the subimage partition constraint, and then partitions the resized input image into a set of subimages for subsequently subimage processing. The concept of this predetermined input image size is described in more detail below.

If the size of input face image 1302 is greater than the maximum input image size supported by CNN module 1306, input module 1304 is further configured to determine if the input image 1302 has dimensions that meet the partition constraint. Related patent application Ser. No. 15/441,194, the content of which is incorporated by reference herein, provides descriptions for partition constraint associated with three-CONV-layer/three-MP-layer CNN system. As discussed in the related application, the partition constraint should be met by input face image 1302 to ensure that after partitioning the input face image 1302 into a set of subimages, processing the set of subimages, and subsequently merging the processed set of subimages into feature maps of the input face image 1302, each of the merged feature maps has no gaps or overlaps. The partition constraint also ensures that the merged feature maps from the individual feature maps of the set of subimages are equivalent to the feature maps generated when the entire input face image 1302 is processed as a whole without using the subimage-based CNN technique. Specifically, for a three-CONV-layer/three-MP-layer CNN system, it was shown that the width and the height of the input image need to meet the condition: $X=8n+14$, wherein n is a positive integer. For example, $X=38$ when $n=3$, $X=46$ when $n=4$, $X=54$ when $n=5$, and $X=62$ when $n=6$. Note that however, other configurations of CNN module 1306 having different numbers of CONV/MP layers can have different partition constraints.

In some embodiments, the partition constraint for age and gender estimation system 1300 is a predetermined input image dimension that satisfies the general partition constraint for the configuration of CNN module 1306. For example, if CNN module 1306 is a three-CONV-layer/three-MP-layer CNN system, the partition constraint for age and gender estimation system 1300 can be a predetermined image dimension that satisfy the condition $X=8n+14$. Hence, the partition constraint can be an input image dimension of 46×46 or 62×62. Using this example, the input face image 1302 meets the partition constraint if input face image 1302 also has the dimension of 46×46 or 62×62.

If input module 1304 determines that input image 1302 meets the predetermined partition constraint, input module 1304 partitions input face image 1302 into a set of subimages. For example, if the predetermined partition constraint is 46×46, input face image 1302 can be partitioned into 4 subimages of size 30×30 with a shift or a stride of 16 pixels between neighbouring subimages. Note that each of the subimages is smaller than the maximum input image size of the built-in hardware CNN module in Hi3519. As another example, if the predetermined partition constraint is 62×62, input face image 1302 can be partitioned into 9 subimages of size 30×30 with a shift or a stride of 16 pixels between neighbouring subimages. However, if input module 1304 determines that input image 1302 does not meet the predetermined partition constraint, input module 1304 is configured to resize input image 1302 to the predetermined input image dimension. For example, if the predetermined partition constraint is 46×46, then an input image 1302 larger than 46×46 will be downsampled to the size of 46×46, whereas an input image 1302 smaller than 46×46 will be upsampled to the size of 46×46. After resizing the input image 1302 to satisfy of the partition constraint, the resize input image 1302 can be partitioned into subimages accordingly as described above.

Note that age and gender estimation system 1300 can be configured with multiple predetermined input image sizes satisfying the general partition constraint of the associated CNN module, and each of the multiple predetermined input image sizes is designed for a particular type of application associated with a given face image resolution. For example, if age and gender estimation system 1300 is to be used in an application where the captured face images contain mostly high resolution faces (e.g., for smart phone cameras), a corresponding predetermined input image size in the age and gender estimation system 1300 should also have a higher resolution. However, if age and gender estimation system 1300 is to be used in an application where the captured face images contain mostly low resolution faces (e.g., a surveillance camera at a retail store), a corresponding predetermined input image size in the age and gender estimation system 1300 should also have a lower resolution.

Note that a higher-resolution predetermined input image size allows for higher accuracy in age and gender estimation but also leads to higher computational cost and processing time. In contrast, a lower-resolution predetermined input image size allows for shorter processing time but can have lower accuracy in age and gender estimation. Hence, age and gender estimation system 1300 can be designed to have multiple predetermined input image sizes for different types of applications. Next, at the time age and gender estimation system 1300 is used for a given application, a particular predetermined input image size among the multiple predetermined input image sizes can be selected based on the typical face image resolutions associated with the given application.

Figure 14:
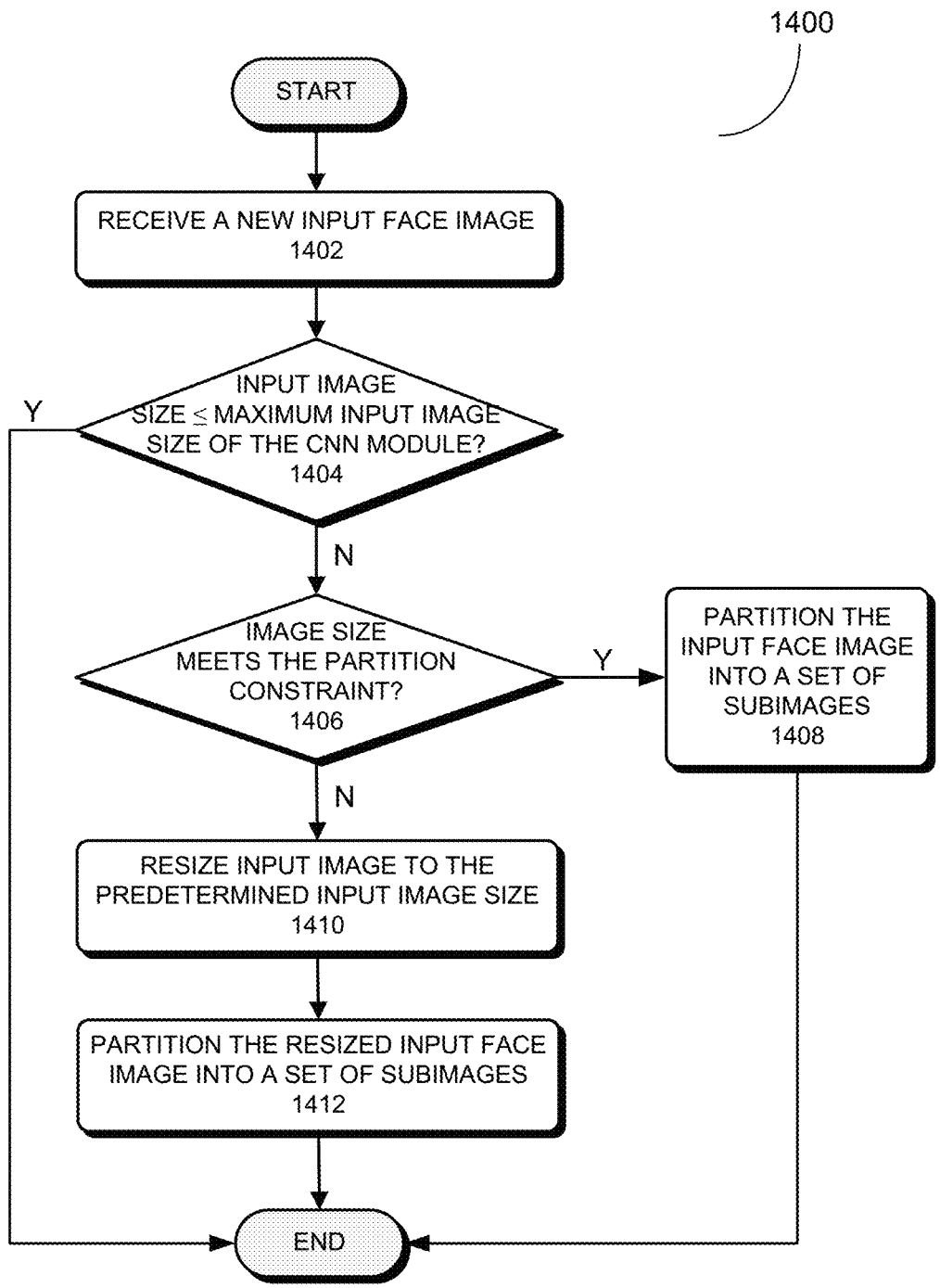
FIG. 14 presents a flowchart illustrating an exemplary process for preprocessing an input face image at the input module in FIG. 13 in accordance with some embodiments described herein.

FIG. 14 presents a flowchart illustrating an exemplary process 1400 for preprocessing an input face image at the input module 1304 in accordance with some embodiments described herein. To begin, input module 1304 receives a new input face image 1302 (step 1402). Input module 1304 subsequently determines if the size of input face image 1302 is smaller than or equal to the maximum input image size of CNN module 1306 (step 1404). In some embodiments, the maximum input image size is the constraint of a small-scale hardware CNN module within CNN module 1306. If the size of input face image 1302 is smaller than or equal to the maximum input image size, input module 1304 can pass input face image 1302 directly to CNN module 1306 without performing any subimage operations. However in some other embodiments, input module 1304 can resize (e.g., by upsampling) input face image 1302 to a predetermined input image size that meets the subimage partition constraint, and then partitions the resized input image into a set of subimages for subsequently subimage processing.

If the size of input face image 1302 is greater than the maximum input image size of CNN module 1306, input module 1304 then determines if the input image 1302 has a size that meets a predetermined partition constraint (step 1406). Note that here we assume input face image 1302 is a square image so that only the size needs to be checked. In general, an input image 1302 meets a partition constraint only if both its width and height meet the partition constraint. If input module 1304 determines that input image 1302 meets the predetermined partition constraint, input module 1304 partitions input face image 1302 into a set of subimages (step 1408) and passes the set of subimages to CNN module 1306. However, if input module 1304 determines that input image 1302 does not meet the predetermined partition constraint, input module 1304 is configured to resize input image 1302 to the predetermined input image size (step 1410). For example, if the input image 1302 is larger than the predetermined input image size, input module 1304 downsamples input image 1302 to the predetermined input image size; whereas if the input image 1302 is smaller than the predetermined input image size, input module 1304 upsamples input image 1302 to the predetermined input image size. Input module 1304 then partitions the resized input face image into a set of subimages (step 1412) and passes the set of subimages to CNN module 1306.

Note that input module 1304 can be implemented in software and processed by the CPU on Hi3519 SoC, because the associated operations have much lower computational complex than the convolution operations.

Figure 15:
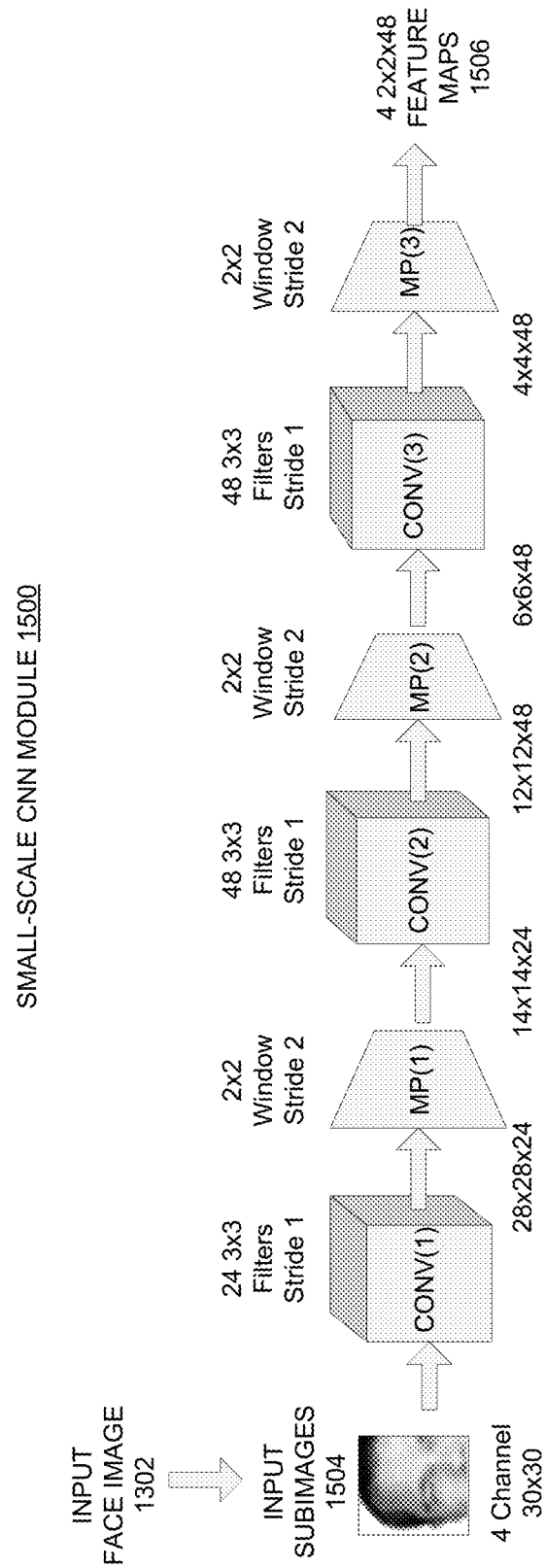
FIG. 15 shows a block diagram of an exemplary implementation of the small-scale CNN module in FIG. 13 in accordance with some embodiments described herein.

FIG. 15 shows a block diagram of an exemplary implementation 1500 of small-scale CNN module 1306 in age and gender estimation system 1300 in accordance with some embodiments described herein. As can be seen in FIG. 15, small-scale CNN module 1500 has the identical CONV-layer/MP-layer structure and identical corresponding parameters as those in age and gender estimation neural network 1200 before the first FC layer (FC(1)). Using the example of an input face image 1302 of size 46×46 (which can be either the original image or the resized image), input module 1304 partitions the 46×46 image into 4 subimages 1504 of size 30×30, which is smaller than the maximum input image size of the built-in hardware CNN module in Hi3519. Each 30×30 subimage can then be processed by small-scale CNN module 1500 as shown in FIG. 15 and the set of 4 subimages 1504 can be processed in a sequential manner.

As can be seen in FIG. 15, for a given 30×30 subimage 1504, CONV(1) layer includes 24 3×3 filters of stride 1. Hence, the output of CONV(1) layer has a dimension of 28×28×24. The MP(1) layer uses 2×2 pooling windows with a stride of 2. Hence, the output of MP(1) layer has a dimension of 14×14×24. The CONV(2) layer includes 48 3×3 filters of stride 1. Hence, the output of CONV(2) layer has a dimension of 12×12×48. The MP(2) layer uses 2×2 pooling windows with a stride of 2. Hence, the output of MP(2) layer has a dimension of 6×6×48. The CONV(3) layer includes 48 3×3 filters of stride 1. Hence, the output of CONV(3) layer has a dimension of 4×4×48. The MP(3) layer uses 2×2 pooling windows with a stride 2. Hence, the output of MP(3) layer has a dimension of 2×2×48, i.e., 48 feature maps 1506 of 2×2 resolution. For the set of 4 subimages 1504, MP(3) layer generates outputs of 4 sets of 48 feature maps 1506 of 2×2 resolution. As described-above, because exemplary 46×46 input face image 1302 meets the partition constraint, outputs from the four 30×30 subimages have no overlap and no gap between adjacent feature maps corresponding to adjacent subimages, and can be concatenated directly to obtain the same output as that of FIG. 12 (i.e., without partitioning input face image 1302) before the FC(1) layer.

Figure 16:
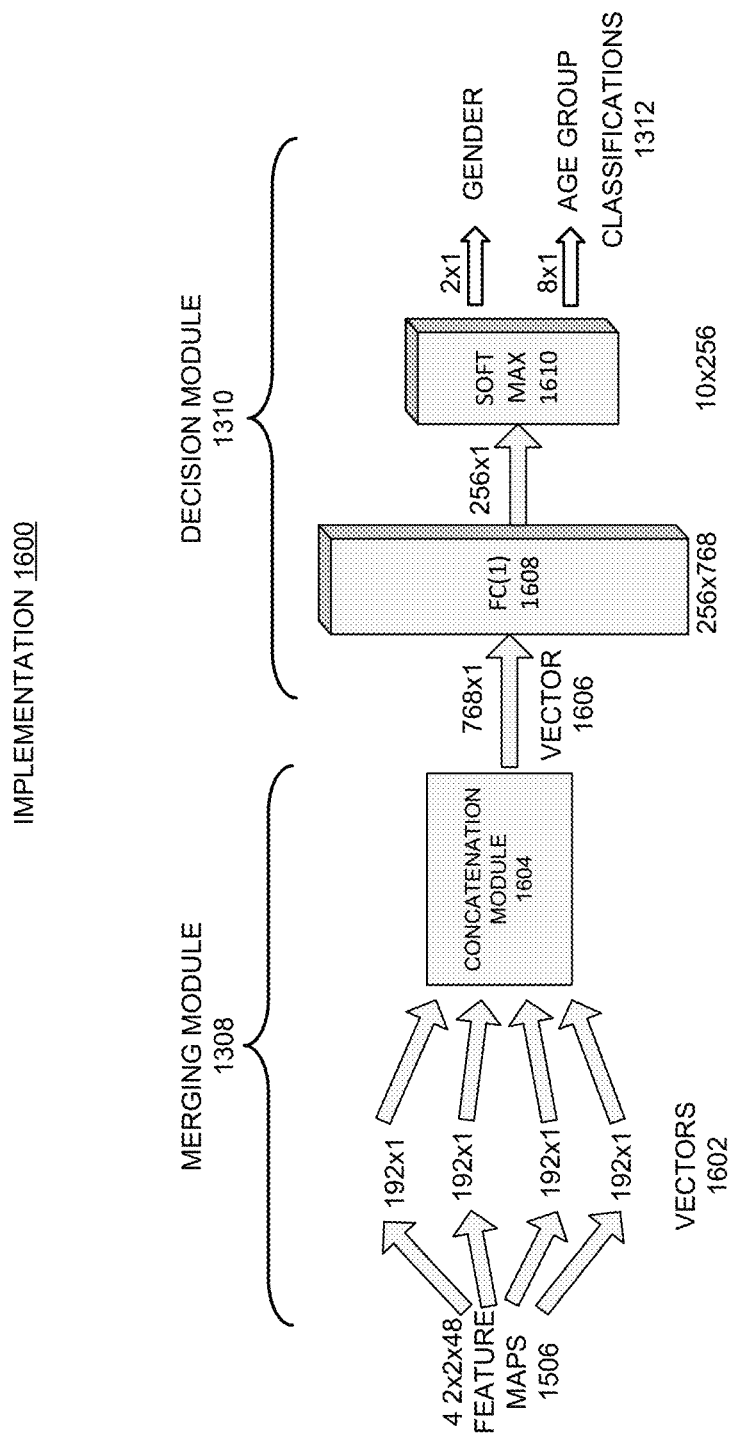
FIG. 16 shows a block diagram of an exemplary implementation of the merging module and the decision module in FIG. 13 in accordance with some embodiments described herein.

FIG. 16 shows a block diagram of an exemplary implementation 1600 of merging module 1308 and decision module 1310 in age and gender estimation system 1300 in accordance with some embodiments described herein. As can be seen in FIG. 16, the outputs from each subimage 1504 in FIG. 15 (i.e., 48×2×2 feature maps) are first converted to four 192×1 vectors 1602. The four vectors 1602 from the four subimages are concatenated by concatenation module 1604 to form a one-dimensional (1D) vector 1606 of size 768×1. The 1D vector 1606 is further processed by an FC layer 1608 and finally softmax classifier 1610 to generate output age and gender classifications 1312 for a given input face image 1302. For example, the age classification can include 8 age groups: 0-2, 4-6, 8-13, 15-20, 25-32, 38-43, 48-53, 60 and above. Note that merging module 1308 and decision module 1310 can be implemented in software and processed by the CPU on Hi3519 SoC, because these operations have much lower computational complex than the convolution operations. In some embodiments, the operation of merging module 1308 and decision module 1310 can be further accelerated by the Arm NEON instruction set on Hi3519 SoC. Note that while FC(1) layer 1608 is shown to have a size of 256, other FC(1) sizes can used for the proposed age and gender estimation system 1300 without departing from the scope of the present technique.

Figure 17:
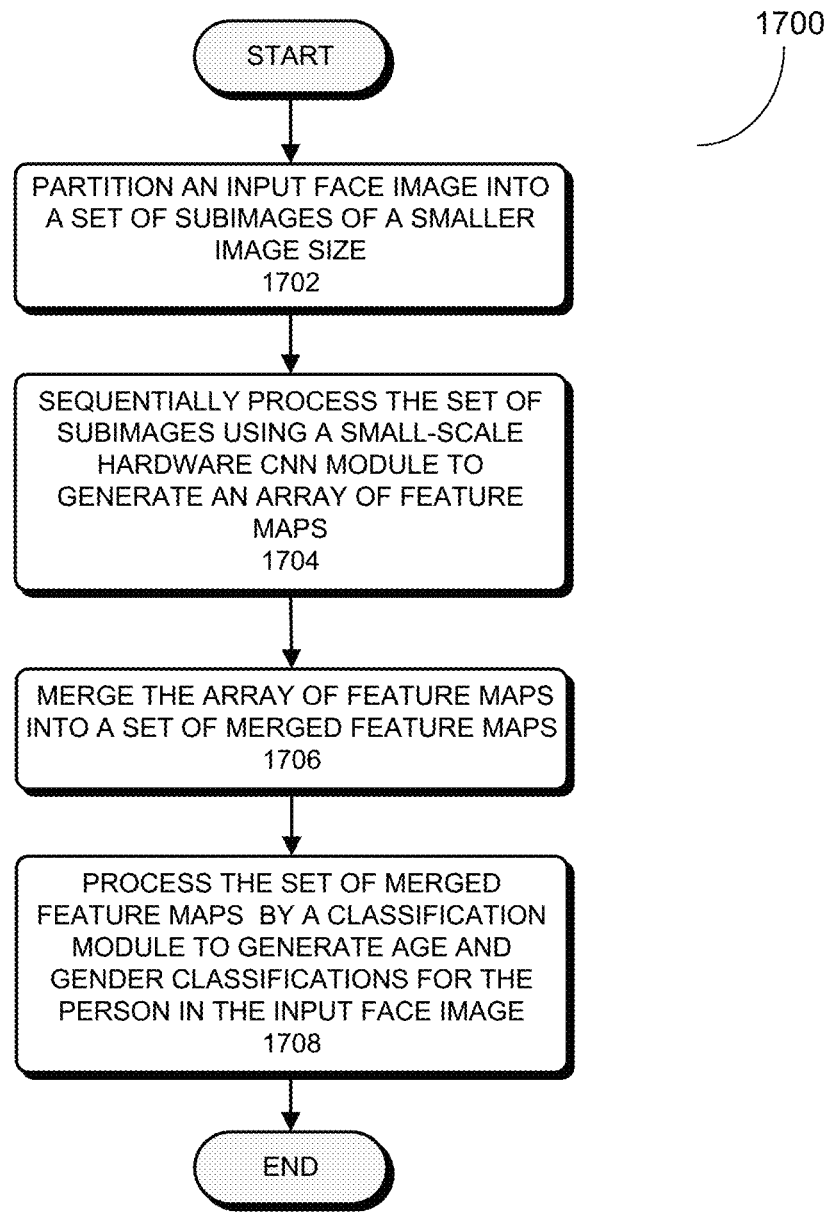
FIG. 17 presents a flowchart illustrating an exemplary process for performing age and gender estimation using the disclosed age and gender estimation system in accordance with some embodiments described herein.

FIG. 17 presents a flowchart illustrating an exemplary process 1700 for performing age and gender estimation using the disclosed age and gender estimation system in accordance with some embodiments described herein. To begin, the disclosed CNN system partitions an input face image into a set of subimages of a smaller image size (step 1702). More specifically, the size of the set of subimages is smaller than the maximum input size supported by the small-scale hardware CNN module within the CNN system. Next, the set of subimages are sequentially processed by the small-scale hardware CNN module to generate an array of feature maps (step 1704). In some embodiments, processing each of the subimages using the small-scale hardware CNN module includes applying multiple stages of CONV layers and MP layers on the subimage.

Next, the array of feature maps output by the small-scale hardware CNN module is merged into a set of merged feature maps (step 1706). More specifically, the set of merged feature maps is identical to the full feature maps generated by a large-scale CNN module which processes the entire input face image without partitioning. Next, the set of merged feature maps are processed by a classification module to generate age and gender classifications for the person associated with the input face image (step 1708). In some embodiments, processing the set of merged feature maps includes applying one or more FC layers following by a softmax classifier on the set of merged feature maps.

While the proposed age and gender estimation system in conjunction with FIGS. 13-16 is described in terms of a predetermined input image size of 46×46, other predetermined input image sizes that satisfy the partition constraint of the associated CNN module can be used, which can be determined based on the specific application. For example, if a predetermined input image size 62×62 is used, each input image or resized input image can be divided into 9 overlapping 30×30 subimages, and there is a stride of 16 pixels between neighboring subimages in both horizontal and vertical directions.

Furthermore, the proposed age and gender estimation technique can be implemented within any embedded system including a resolution-limited small-scale hardware CNN module, and hence is not limited to Hi3519. Note that the ability to perform in-situ age and gender estimation on a set of detected face images within an embedded system immediately after performing in-situ face detections on the captured video or still images, rather than using a separate device, system, or server to perform age and gender estimation on the detected face images, can significantly reduce operational cost. In some embodiments, the proposed age and gender estimation system can also be implemented on a low-cost embedded system which does not include a face detection mechanism. In these embodiments, the low-cost embedded system can directly receive face images from one or more external sources, and subsequently perform dedicated age and gender estimation operations on the received face images using the proposed age and gender estimation system.

It should be understood that, the various embodiments of the age and gender estimation system and technique described herein can also be applied to object classifications. In such applications, the input face images become images of various objects to be classified, the small-scale CNN module was trained based on a set of training object images, and the outputs of the classification system represent predicted objects for each input object image.

Figure 18:
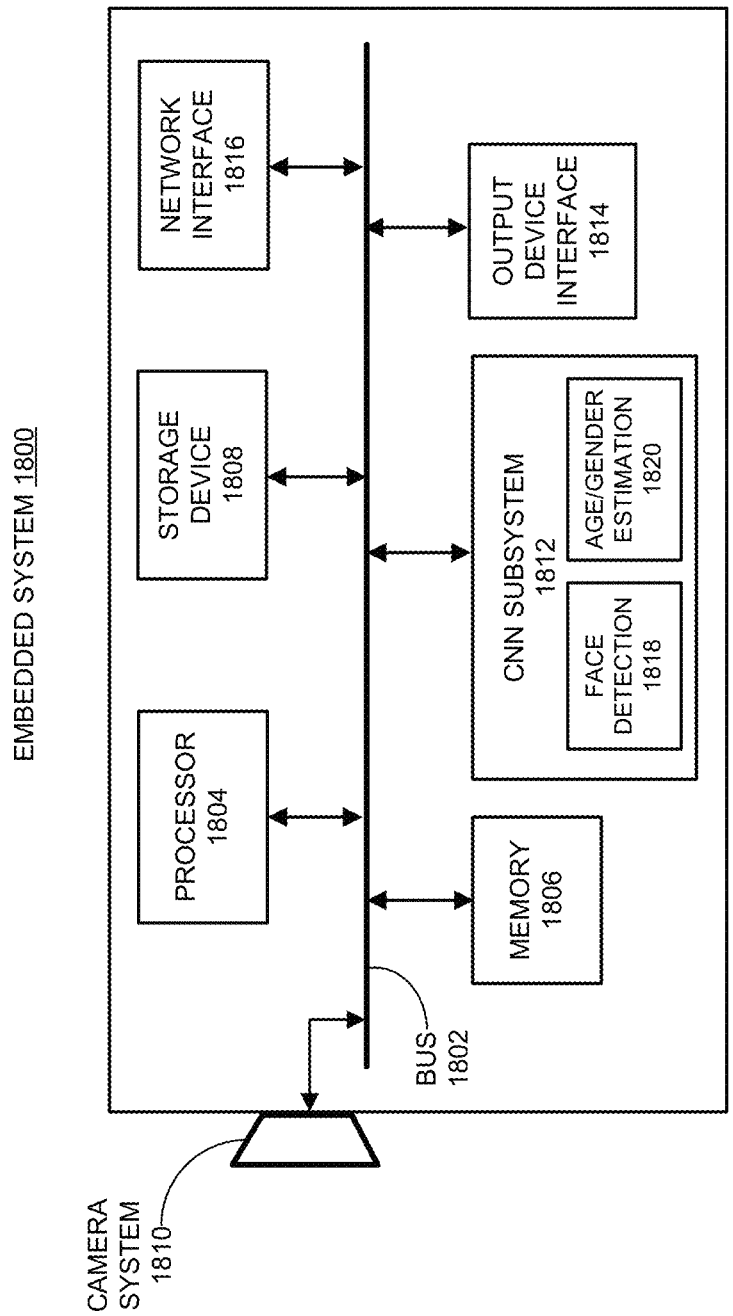
FIG. 18 illustrates an exemplary embedded system within which the disclosed subimage-based face-detection system and the subimage-based age-and-gender-estimation system are implemented in accordance with some embodiments described herein.

FIG. 18 illustrates an exemplary embedded system 1800 within which the disclosed face-detection system and age-and-gender-estimation system are implemented in accordance with some embodiments described herein. Embedded system 1800 can be integrated with or implemented as a surveillance camera system, a machine vision system, a drone, a robot, or a self-driving car. As can be seen in FIG. 18, embedded system 1800 can include a bus 1802, a processor 1804, a memory 1806, a storage device 1808, a camera system 1810, a CNN subsystem 1812, an output device interface 1814, and a network interface 1816.

Bus 1802 collectively represents all system, peripheral, and chipset buses that communicatively couple the various components of embedded system 1800. For instance, bus 1802 communicatively couples processor 1804 with memory 1806, storage device 1808, camera system 1810, CNN subsystem 1812, output device interface 1814, and network interface 1816.

From memory 1806, processor 1804 retrieves instructions to execute and data to process in order to control various components of embedded system 1800. Processor 1804 can include any type of processor, including, but not limited to, a microprocessor, a mainframe computer, a digital signal processor, a personal organizer, a device controller and a computational engine within an appliance, and any other processor now known or later developed. Furthermore, processor 1804 can include one or more cores. Processor 1804 itself can include a cache that stores code and data for execution by processor 1804.

Memory 1806 can include any type of memory that can store code and data for execution by processor 1804. This includes but not limited to, dynamic random access memory (DRAM), static random access memory (SRAM), flash memory, read only memory (ROM), and any other type of memory now known or later developed.

Storage device 1808 can include any type of non-volatile storage device that can be integrated with embedded system 1800. This includes, but is not limited to, magnetic, optical, and magneto-optical storage devices, as well as storage devices based on flash memory and/or battery-backed up memory.

Bus 1802 is also coupled to camera system 1810. Camera system 1810 is configured to capture still images and/or video images at predetermined resolutions and couple the captured image or video data to various components within embedded system 1800 via bus 1802, such as to memory 1806 for buffering and to CNN subsystem 1812 for DL face detection. Camera system 1810 can include one or more digital cameras. In some embodiments, camera system 1810 includes one or more digital cameras equipped with wide-angle lenses. The captured images by camera system 1810 can have different resolutions including high-resolutions such as at 1280×720 p, 1920×1080 p or other high resolutions.

In some embodiments, CNN subsystem 1812 further includes a face detection subsystem 1818 and an age and gender estimation subsystem 1820. CNN subsystem 1812 is configured to receive the captured video images, such as captured high-resolution video images via bus 1802, perform aforementioned face detection operations on the received video images using face detection subsystem 1818 to generate face detection results for the captured video images, and to further perform aforementioned age and gender detection operations on the detected face images using age and gender estimation subsystem 1820 to generate age and gender classifications for the detected face images. In particular, CNN subsystem 1812 can include one or more small-scale hardware CNN modules. For example, CNN subsystem 1812 can include one or more Hi3519 SoCs, each of which includes both a build-in hardware CNN module and a CPU that can execute software CNN functions. In some embodiments, CNN subsystem 1812 is implemented in accordance with one of the various embodiments of the disclosed face detection system 300 and the disclosed age and gender estimation system 1300 of this disclosure.

Output device interface 1814 which is also coupled to bus 1802, enables for example, the display of the results generated by CNN subsystem 1812. Output devices used with output device interface 1814 include, for example, printers and display devices, such as cathode ray tube displays (CRT), light-emitting diode displays (LED), liquid crystal displays (LCD), organic light-emitting diode displays (OLED), plasma displays, or electronic paper.

Finally, as shown in FIG. 18, bus 1802 also couples embedded system 1800 to a network (not shown) through a network interface 1816. In this manner, embedded system 1800 can be a part of a network (such as a local area network ("LAN"), a wide area network ("WAN"), or an Intranet, or a network of networks, such as the Internet. Any or all components of embedded system 1800 can be used in conjunction with the subject disclosure.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for performing age and gender estimation on face images using a small-scale convolutional neural network (CNN) module associated with a maximum input size constraint, the method comprising:
receiving, by a computer, an input face image which is primarily occupied by a human face;
determining, using the computer, if a size of the input face image is greater than a maximum input image size supported by the small-scale CNN module according to the maximum input size constraint; and
if so, determining if the size of the input face image meets a predetermined input image size constraint, wherein the predetermined input image size constraint is a given image size among a plurality of image sizes which satisfy a condition for partitioning an input image into multiple subimages of a second size, and wherein the second size is smaller than the maximum input image size;
if so,
partitioning the input face image into a set of subimages of the second size;
processing the set of subimages using the small-scale CNN module to generate an array of feature maps;
merging the array of feature maps into a set of merged feature maps corresponding to the input face image; and
processing the set of merged feature maps with two or more fully-connected layers to generate one or both of age and gender classifications for a person in the input face image.

2. The method of claim 1, wherein if the size of the input face image does not meet the predetermined input image size constraint, the method further comprises:
resizing the input face image to the given image size that meets the predetermined input image size constraint;
partitioning the resized input face image into a set of subimages of the second size;
processing the set of subimages using the small-scale CNN module to generate an array of feature maps;
merging the array of feature maps into a set of merged feature maps corresponding to the resized input face image; and
processing the set of merged feature maps with two or more fully-connected layers to generate one or both of age and gender classifications for the person in the input face image.

3. The method of claim 2, wherein resizing the input face image to the given image size includes:

if the size of the input face image is greater than the given image size, downsampling the input face image to the given image size; and if the size of the input face image is smaller than the given image size, upsampling the input face image to the given image size.

4. The method of claim 1, wherein if the size of the input face image is smaller than or equal to the maximum input image size associated with the small-scale CNN module, the method further comprises processing the input face image directly with the small-scale CNN module without partitioning the input face image into a set of subimages of a smaller size.

5. The method of claim 1, wherein if the size of the input face image is smaller than or equal to the maximum input image size associated with the small-scale CNN module, the method further comprises:

upsampling the input face image to the given image size that meets the predetermined input image size constraint;

partitioning the resized input face image into a set of subimages of the second size;

processing the set of subimages using the small-scale CNN module to generate an array of feature maps;

merging the array of feature maps into a set of merged feature maps corresponding to the resized input face image; and processing the set of merged feature maps with two or more fully-connected layers to generate one or both of age and gender classifications for the person in the input face image.

6. The method of claim 1, wherein the input face image is an output of a face detection CNN module which detects human faces from input video images.

7. The method of claim 1, wherein the small-scale CNN module includes three convolution layers, wherein each of the three convolution layers is followed by a rectified linear units (ReLU) layer and a pooling layer.

8. The method of claim 1, wherein the last one of the two or more fully-connected layers includes a softmax classifier.

9. An age and gender estimation system using at least one small-scale convolutional neural network (CNN) module, comprising:

an input module configured to receive an input face image which is primarily occupied by a human face;

a small-scale CNN module coupled to an output of the input module and configured to process a face image using a set of filters, wherein the small-scale CNN module has a maximum input size constraint;

a merging module coupled to an output of the small-scale CNN module; and a decision module comprising two or more fully-connected layers and coupled to an output of the merging module;

wherein the input module is further configured to:

determine if a size of the input face image is greater than a maximum input image size supported by the small-scale CNN module according to the maximum input image size constraint;

if so, determine if the size of the input face image meets a predetermined input image size constraint, wherein the predetermined input image size constraint is a given image size among a plurality of image sizes which satisfy a condition for partitioning an input image into multiple subimages of a second size, and wherein the second size is smaller than the maximum input image size; and if so, partition the input face image into a set of subimages of the second size;

wherein the small-scale CNN module is configured to process the set of subimages to generate an array of feature maps;

wherein the merging module is configured to merge the array of feature maps into a set of merged feature maps corresponding to the input face image; and wherein the decision module is configured to process the set of merged feature maps with the two or more fully-connected layers to generate one or both of age and gender classifications for a person in the input face image.

10. The age and gender estimation system of claim 9, wherein if the size of the input face image does not meet the predetermined input image size constraint, the input module is further configured to:

resize the input face image to the given image size that meets the predetermined input image size constraint; and partition the resized input face image into a set of subimages of the second size;

the small-scale CNN module is further configured to process the set of subimages to generate an array of feature maps;

the merging module is further configured to merge the array of feature maps into a set of merged feature maps corresponding to the resized input face image; and the decision module is further configured to process the set of merged feature maps with two or more fully-connected layers to generate one or both of age and gender classifications for the person in the input face image.

11. The age and gender estimation system of claim 10, wherein the input module resizes the input face image to the given image size by:

if the size of the input face image is greater than the given image size, downsampling the input face image to the given image size; and if the size of the input face image is smaller than the given image size, upsampling the input face image to the given image size.

12. The age and gender estimation system of claim 9, wherein if the size of the input face image is smaller than or equal to the maximum input image size associated with the small-scale CNN module, the small-scale CNN module is further configured to process the input face image directly without partitioning the input face image into a set of subimages of a smaller size.

13. The age and gender estimation system of claim 9, wherein if the size of the input face image is smaller than or equal to the maximum input image size associated with the small-scale CNN module, the input module is further configured to:

upsample the input face image to the given image size that meets the predetermined input image size constraint; and partition the resized input face image into a set of subimages of the second size;

the small-scale CNN module is further configured to process the set of subimages to generate an array of feature maps;

the merging module is further configured to merge the array of feature maps into a set of merged feature maps corresponding to the resized input face image; and the decision module is further configured to process the set of merged feature maps with two or more fully-connected layers to generate one or both of age and gender classifications for the person in the input face image.

14. The age and gender estimation system of claim 9, wherein the input module is coupled to an output of a face detection CNN module which detects human faces from input video images, and wherein the input face image is an output of the face detection CNN module.

15. The age and gender estimation system of claim 9, wherein the small-scale CNN module includes three convolution layers, wherein each of the three convolution layers is followed by a rectified linear units (ReLU) layer and a pooling layer.

16. The age and gender estimation system of claim 9, wherein the last one of the two or more fully-connected layers includes a softmax classifier.

17. The age and gender estimation system of claim 9, wherein the small-scale CNN module is a hardware CNN module embedded within a chipset or a system on chip (SoC).

18. The age and gender estimation system of claim 9, wherein the merging module merges the array of feature maps by concatenating the array of feature maps into a one-dimensional vector.

19. An embedded system capable of performing both face detection and age and gender estimation in-situ on captured video images, the embedded system comprising:
    a processor;
    a memory coupled to the processor;
    an image capturing device coupled to the processor and the memory and configured to capture video images;
    a face detection subsystem coupled to the image capturing device and configured to detect human faces from the capture video images; and
    an age and gender estimation subsystem coupled to the face detection subsystem and including a small-scale CNN module associated with a maximum input size constraint, wherein the age and gender estimation subsystem is configured to:
        receive a detected face image from the face detection subsystem which is primarily occupied by a human face;
        determine if a size of the detected face image is greater than a maximum input image size supported by the small-scale CNN module according to the maximum input size constraint:
        if so, determine if the size of the detected face image meets a predetermined input image size constraint, wherein the predetermined input image size constraint is a given image size among a plurality of image sizes which satisfy a condition for partitioning an input image multiple subimages of a second size, and wherein the second size is smaller than the maximum input image size; and
        if so,
            partition the detected face image into a set of subimages of the second size;
            process the set of subimages using the small-scale CNN module to generate an array of feature maps;
            merge the array of feature maps into a set of merged feature maps corresponding to the detected face image; and
            process the set of merged feature maps with two or more fully-connected layers to generate one or both of age and gender classifications for a person in the detected face image.

20. The embedded system of claim 19, wherein the small-scale CNN module is a low-cost hardware CNN module which is shared by the age and gender estimation subsystem and the face detection subsystem.

21. A method for performing deep-learning image processing using a small-scale convolutional neural network (CNN) module associated with a maximum input size constraint, the method comprising:
    receiving an input image;
    determining if a size of the input image is greater than a maximum input image size supported by the small-scale CNN module according to the maximum input size constraint; and
    if so,
        partitioning the input image into a set of subimages of a second size smaller than the maximum input image size;
        processing the set of subimages using the small-scale CNN module to generate an array of feature maps;
        merging the array of feature maps into a set of merged feature maps corresponding to the input image; and
        processing the set of merged feature maps with two or more fully-connected layers to generate a classification decision on the input image.

22. The method of claim 21, wherein the size of the input image meets a predetermined input image size constraint, wherein the predetermined input image size constraint is a given image size among a plurality of image sizes which satisfy a condition for partitioning an input image into a set of subimages of the second size.

23. The method of claim 21, wherein if the size of the input image is smaller than or equal to the maximum input image size supported by the small-scale CNN module, the method further comprises processing the input image directly with the small-scale CNN module without partitioning the input image into a set of subimages of a smaller size.

24. The method of claim 21, wherein the input image is an input face image which is primarily occupied by a human face, and wherein the classification decision on the input image includes one or both of age and gender classifications for the person in the input face image.

25. The method of claim 21, wherein the set of subimages includes a predetermined overlap between a pair of adjacent subimages in the set of subimages, and wherein a pair of adjacent feature maps in the array of feature maps corresponding to a pair of adjacent subimages in the set of subimages has no overlap and no gap between the pair of adjacent feature maps.

* * * * *